United States Patent [19]

Yagita et al.

[11] Patent Number: 5,900,876
[45] Date of Patent: May 4, 1999

[54] INFORMATION PROCESSING APPARATUS AND METHOD WITH DISPLAY BOOK PAGE TURNING

[75] Inventors: Takashi Yagita, Tokyo; Mitsuo Kimura, Yokohama, both of Japan

[73] Assignee: Canon Kabushiki Kaisha, Tokyo, Japan

[21] Appl. No.: 08/630,766

[22] Filed: Apr. 10, 1996

[30] Foreign Application Priority Data

Apr. 14, 1995 [JP] Japan .................................. 7-113860
Sep. 20, 1995 [JP] Japan .................................. 7-241608

[51] Int. Cl.$^6$ .................................................. G06F 3/00
[52] U.S. Cl. .................................................... 345/350
[58] Field of Search ......................................... 395/350

[56] References Cited

U.S. PATENT DOCUMENTS

| | | | |
|---|---|---|---|
| 5,146,555 | 9/1992 | Kiyohara .................................. 395/342 |
| 5,237,651 | 8/1993 | Randall ..................................... 395/350 |
| 5,283,864 | 2/1994 | Knowlton ................................. 395/864 |
| 5,333,255 | 7/1994 | Damouth ................................. 395/350 |
| 5,416,895 | 5/1995 | Anderson et al. .................. 395/350 X |
| 5,463,725 | 10/1995 | Henkel et al ........................... 395/350 |

*Primary Examiner*—A. Katbab
*Attorney, Agent, or Firm*—Fitzpatrick, Cella, Harper & Scinto

[57] ABSTRACT

The conventional technology of designating a page with a scroll bar or by a dialogue and displaying the designated page can only display the designated page. According to the present invention, when an icon displayed in the form of a book in open state is designated with a mouse, the designated position is judged, and, if it is on the right-side page, the image of the designated page is displayed in compressed state to the designated point, and an underlying page is displayed. Then the designated page is turned over and the images of the succeeding two pages are displayed. When the left-side page is designated, the preceding two pages are displayed through a similar process.

37 Claims, 18 Drawing Sheets

INFORMATION PROCESSING APPARATUS AND METHOD WITH DISPLAY BOOK PAGE TURNING

BACKGROUND OF THE INVENTION

1. Field of the Invention

The present invention relates to an information processing apparatus enabling reference to text information of plural pages on the display image area in the form of actual book, thereby realizing easy access to a multitude of information, and a method therefor.

2. Related Background Art

The graphical user interface (GUI) is a use environment of the computer, realizing the human-computer dialogue through a picture instead of the characters, and, among such GUI, there is already known a system capable of displaying, on the display image area, a page of the text information as if an arbitrary page of an actual book is opened.

In the conventional GUI based on the Windows format, the page of the information displayed on the browse window is switched by page designation with a scroll bar or by dialogue.

However, in such conventional technology of displaying on the browse window by page designation with the scroll bar or by dialogue, the display is limited to the designated page, so that the user is unable to easily refer to the information of plural pages with the feeling of turning pages of a book.

Also the operation of referring to a next page, employed for example in the editor of the word processor, is complex in manipulation for the user who is not used to the operations of the word processor.

SUMMARY OF THE INVENTION

In consideration of the foregoing, an object of the present invention is to provide an information processing apparatus capable of turning plural pages at a time, and a page turning method therefor.

Another object of the present invention is to provide an information processing apparatus enabling easy reference to the information of plural pages with a simple method of operation, and a method therefor.

The above-mentioned objects can be attained, according to the present invention, by an information processing apparatus comprising tag memory means for storing plural tags which are correlated with specified pages in the image of a book on a display image area; display means for displaying, on said display image area, the image of said book with the plural tags stored in said tag memory means; tag designation means for designating a specified tag among the plural tags stored in said tag memory means; and page turning means for turning plural pages, based on the tag designation by said tag designation means.

Also according to the present invention, there is provided a page turning method, for use in an information processing apparatus, comprising steps of displaying the image of a book on a display image area with plural tags correlated with the specified pages of the book on the display image area, and designating a specified among the plural tags thereby turning plural pages.

Also according to the present invention, there is provided an information processing apparatus comprising display means for displaying an icon in the form of a book in an open state; designation means for designating the above-mentioned icon; judgment means for judging the designated position when the icon is designated; and control means for turning a page of the icon based on the result of judgment by the judgment means, wherein the control means is adapted to display the image of a page, corresponding to the designation of the icon, in compressed manner to a position designated by the designation means.

Also according to the present invention, there is provided an information processing method, comprising a display step of displaying an icon in the form of a book in an open state; a designation step of designating the above-mentioned icon; a judgment step of judging the designated position when the icon is designated; and a control step of turning a page of the icon based on the result of judgment in the judgment step, wherein the control step is adapted to display the image of a page, corresponding to the designation of the icon, in compressed manner to a position designated by the designation step.

DETAILED DESCRIPTION OF THE PREFERRED EMBODIMENTS (a) First embodiment:

In the following there will be given a detailed explanation on a first embodiment of the present invention.

Figure 1:
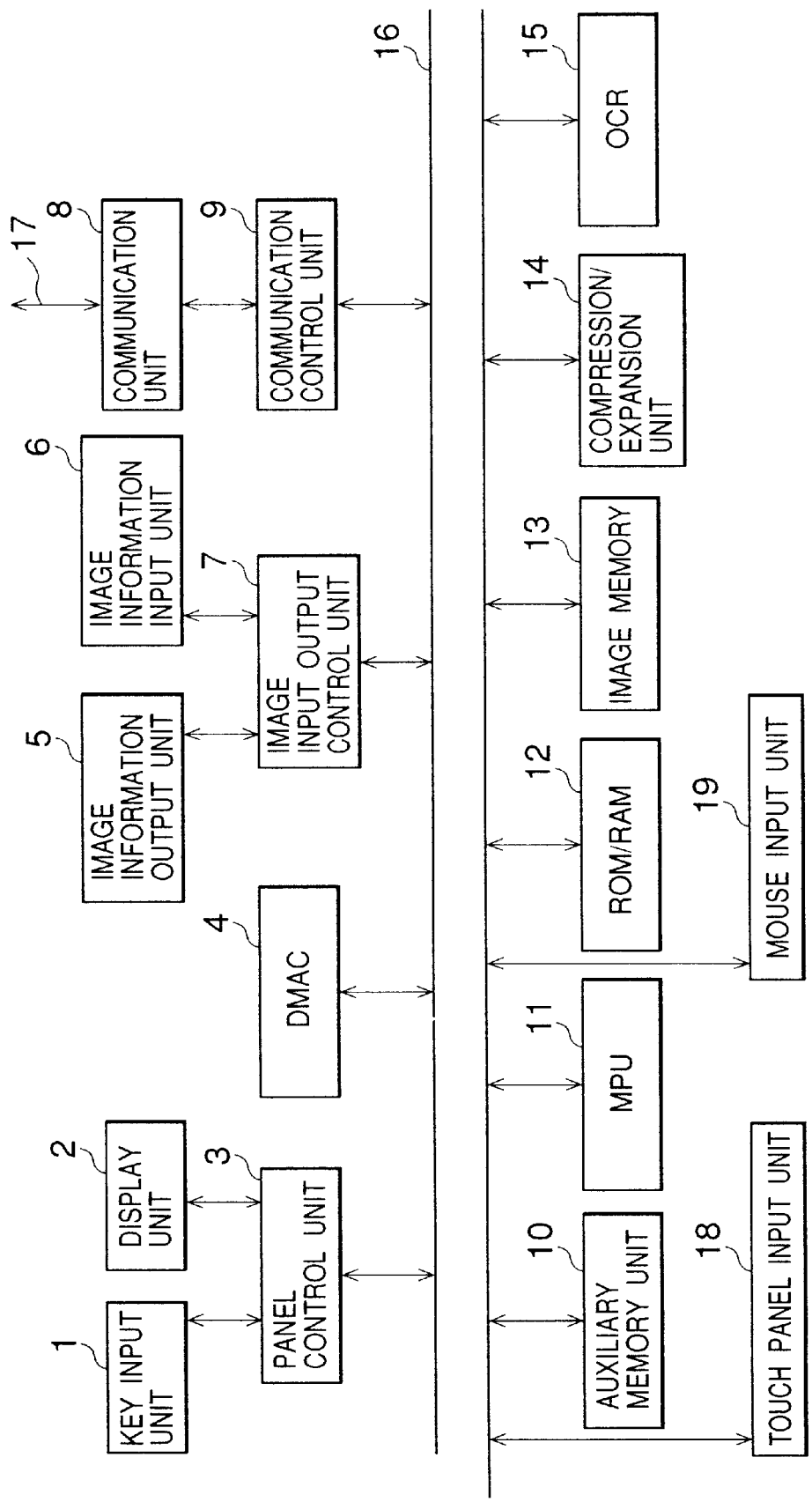
FIG. 1 is a block diagram showing the configuration of an information processing apparatus constituting a first embodiment of the present invention.

FIG. 1 is a block diagram showing the configuration of an information processing apparatus constituting the first embodiment of the present invention.

In FIG. 1, there are shown a key input unit 1 to be operated by the operator for entering various information; a display unit 2 for displaying various messages and images; a panel control unit 3 controlling the key input unit 1 and the display unit 2 mentioned above; a DMA controller (DMAC) 4 for effecting DMA transfer of image data etc.; an image information output unit 5, receiving the image information released through an image input/output control unit 7 to be explained later; an image input/output control unit 7 for effecting interface control between the image information output unit, an image information input unit 6 and a system bus 16 and controlling the above-mentioned units 5, 6; a communication unit 8 for effecting communication through a communication line 17; and a communication control unit 9 for controlling the communication unit 8.

An auxiliary memory unit 10 is provided with a large-capacity memory, such as a hard disk, for storing a compressed image received through the communication unit 8 or an image for transmission, compressed by a compression/expansion unit 14 to be explained later. An MPU 11, such as a microprocessor, controls the entire apparatus by generating various data signals and control signals according to a control program stored in a ROM 12 to be explained later. A ROM/RAM 12 is used for storing control programs as indicated by flow charts in FIGS. 2 and 3, and as a work area for the MPU 11, for temporarily storing various control data.

An image memory 13 is used for temporarily storing the image data entered from the image information input unit 6 or received by the communication unit 8, and storing the image data to be transmitted to the image information output unit 5. A compression/expansion unit 14 effects compression or expansion of the image information transmitted or received by the communication unit 8. A character recognition unit (OCR) 15 is used for recognizing characters and symbols, in the image read by the image information input unit 6 or received from the communication line 17 through the communication unit 8. There are also provided a system bus 16; a touch panel signal input unit 18; and a mouse signal input unit 19.

In the following there will be given a detailed description, with reference to a flow chart in FIG. 2, on the book-shaped browsing method of the present embodiment.

Figure 2:
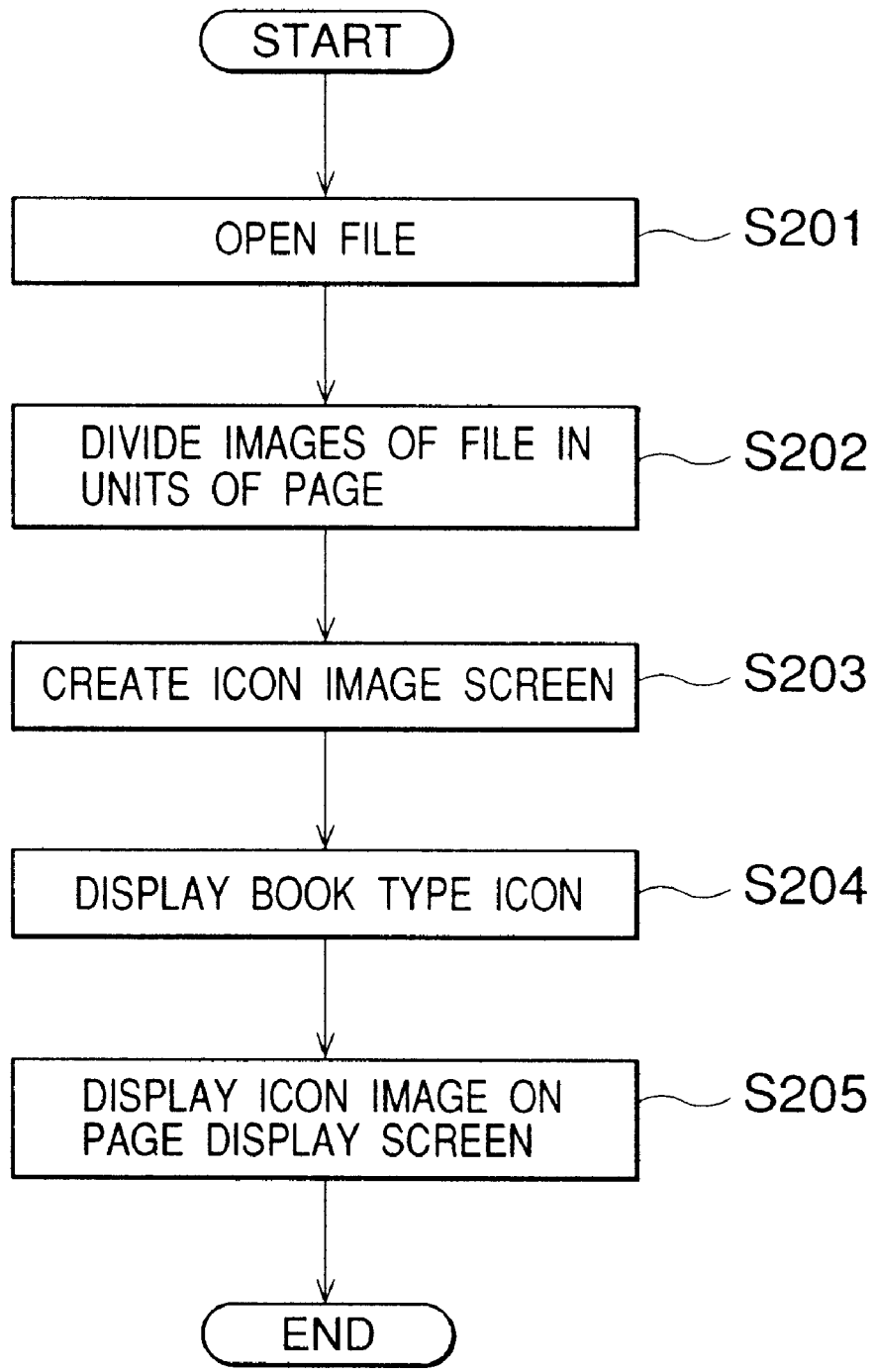
FIG. 2 is a flow chart showing the information display sequence in the first embodiment.
Figure 4:
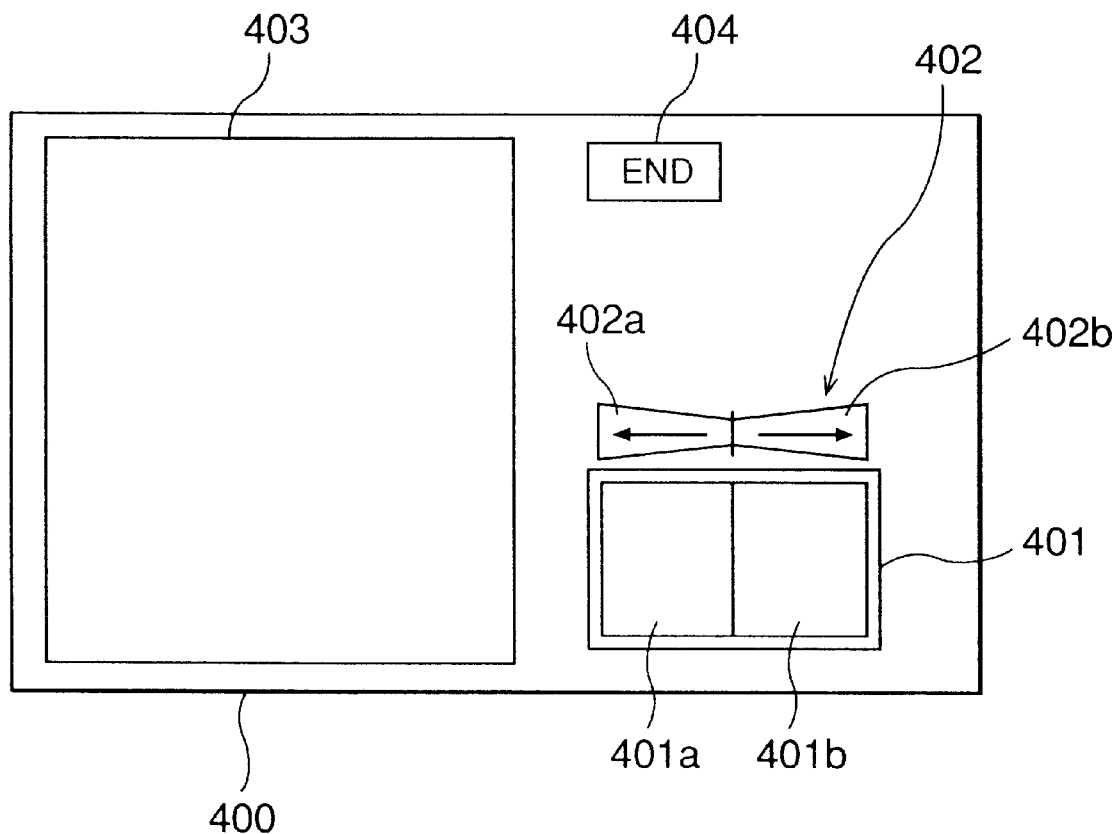
FIG. 4 is a view showing a browsing image frame of the present invention.
Figure 5:
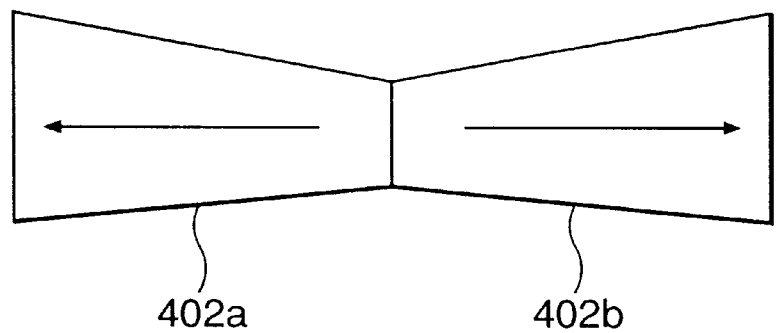
FIG. 5 is a view of a page display button.

FIG. 2 is a flow chart showing a method of information display on the display image area in the present embodiment FIG. 4 illustrates a browsing image area 400 of the present embodiment, consisting of a book-shaped icon 401; a page display button 402; a page display image area 403; an end button 404 etc.

Referring to FIG. 2, a step S201 opens a file when it is selected by the user. Then a step S202 divides the file into information that can be displayed in a page, thereby forming a page image of an arbitrary page. A step S203 prepares an icon image by reducing the page image, prepared in the step S202, into an icon size. Then a step S204 displays the icon image, prepared in the step S203, in the book-shaped icon 401 in FIG. 4 in an open state, i.e. with the icon image of page 1 in a left-side page icon area 401a and the icon image of page 2 in a right-side page icon area 401b. Then a step S205 displays, in the page display image area 403 in FIG. 4, the page image prepared in the step S202 and corresponding to the left page icon area 401a.

Figure 3:
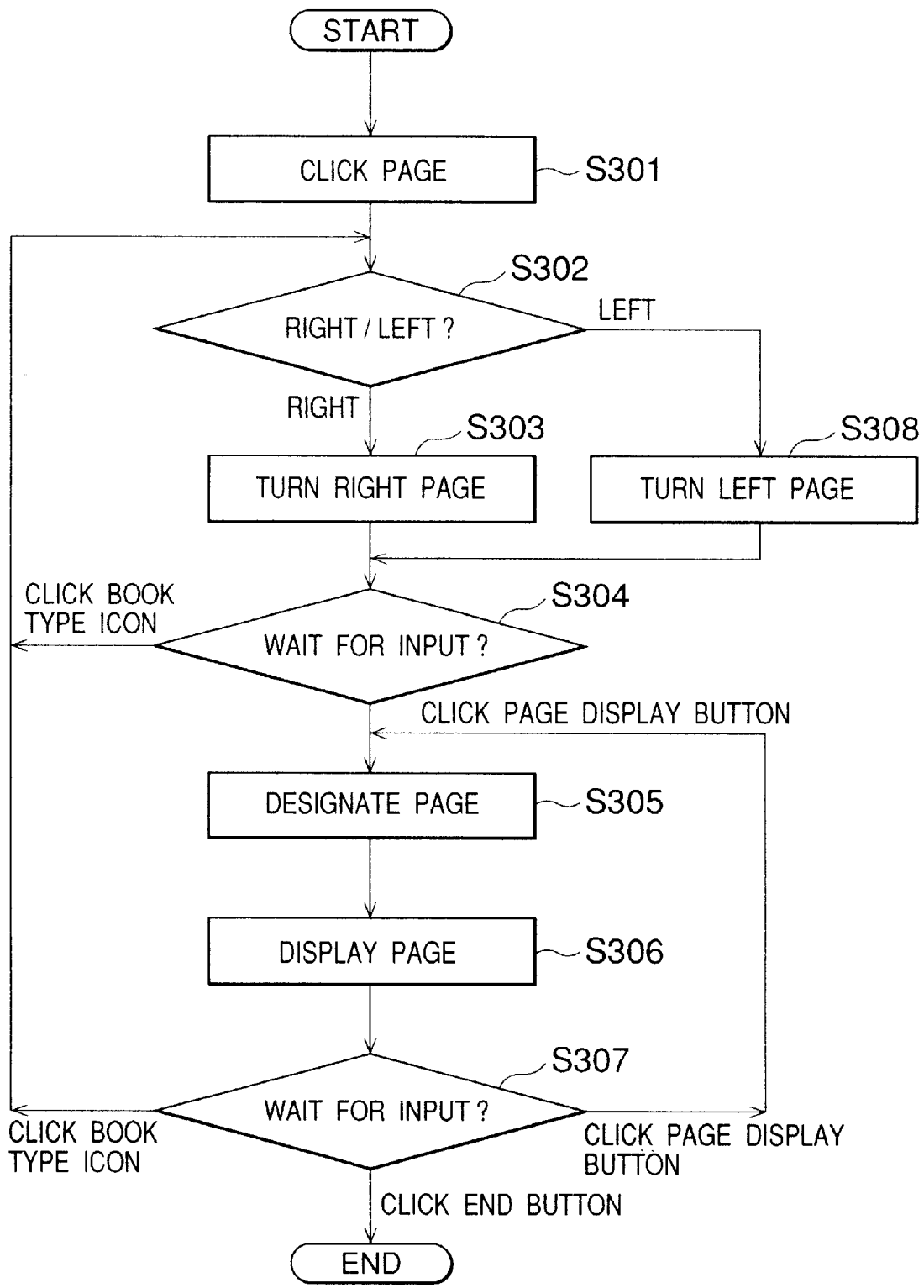
FIG. 3 is a flow chart of a browsing function utilizing a book-shaped icon.

FIG. 3 is a flow chart showing the browsing function utilizing the book-shaped icon.

It is now assumed that, in the book-shaped icon, the left page icon area 401a displays an icon image of a page 2n−1, while the right page icon area 401b displays an icon image of a page 2n, wherein n is a positive integer. When the user clicks, with a mouse, in the book-shaped icon 401, a step S301 detects the clicked position, and a step S302 judges whether the clicked position is either in the left page icon area 401a or in the right page icon area 401b.

If the right page icon area 401b is clicked, a step S303 effects a page turning process in the page advancing direction, wherein icon images of pages 2n+1 and 2(n+1) are displayed respectively in the left and right. On the other hand, if the step S302 identifies that the right page icon area 401a is clicked, a step S308 effects a page turning process in the reverse direction, whereby icon images of pages 2(n−1)−1 and 2(n−1) are displayed respectively in the left and right After the page turning process in the step S303 or S308, the sequence enters a stand-by state awaiting the operation of the operator If the book-shaped icon is clicked in a step S304, there is executed the process starting from the step S302.

If the user clicks the page display button 402 in FIG. 4 in the stand-by step S304, and if it is in a left-side page display button area 402a, a step S305 displays, in the page window 403 in FIG. 4, a page image corresponding to the icon image displayed in the left page icon area 401a. Also if it is in a right-side page display button area 402b, the step S305 displays, in the page window 403, a page image corresponding to the icon image displayed in the right page icon area 401b.

After the display of the page image in the page window, the sequence enters a stand-by state awaiting an operation of the user, and a step S307 judges the position of clicking to determine the subsequent process.

If the book-shaped icon 401 is clicked, there is executed a process starting from the step S302. If the page display button 402 is clicked, there is executed a process starting from the step S305. Also if the end button 404 is selected, the process of this flow chart is terminated.

In the following there will be explained, with reference to a flow chart in FIG. 6, the right page turning process in the step S303.

Figure 7:
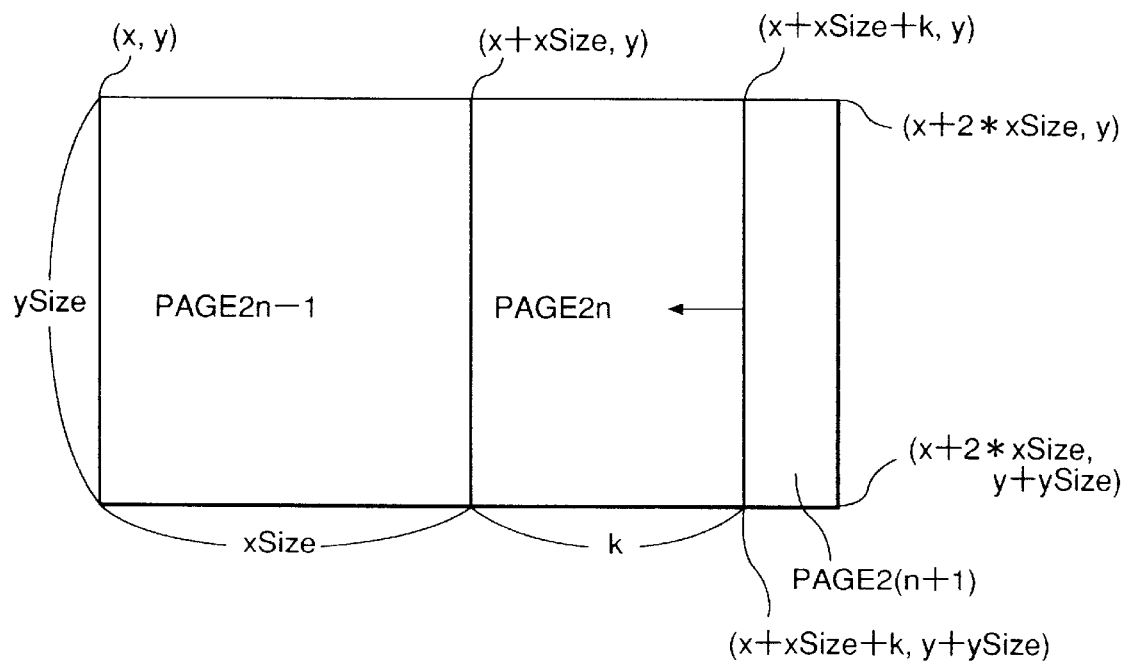
FIGS. 7 and 8 are magnified views of a book-shaped icon.
Figure 8:
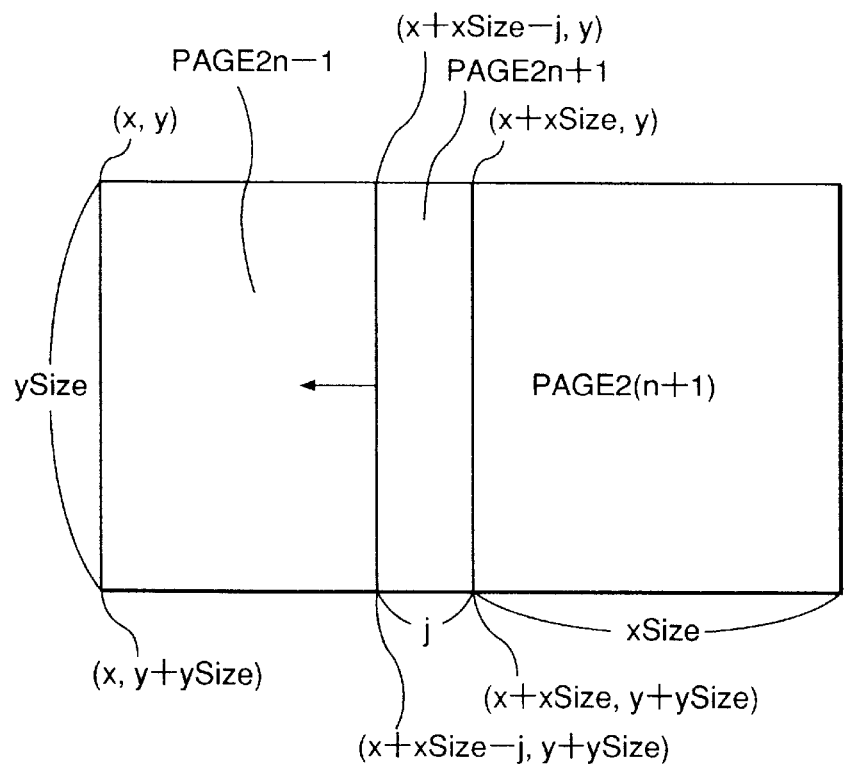

FIGS. 7 and 8 are magnified views of the book-shaped icon shown in FIG. 4.

Figure 6:
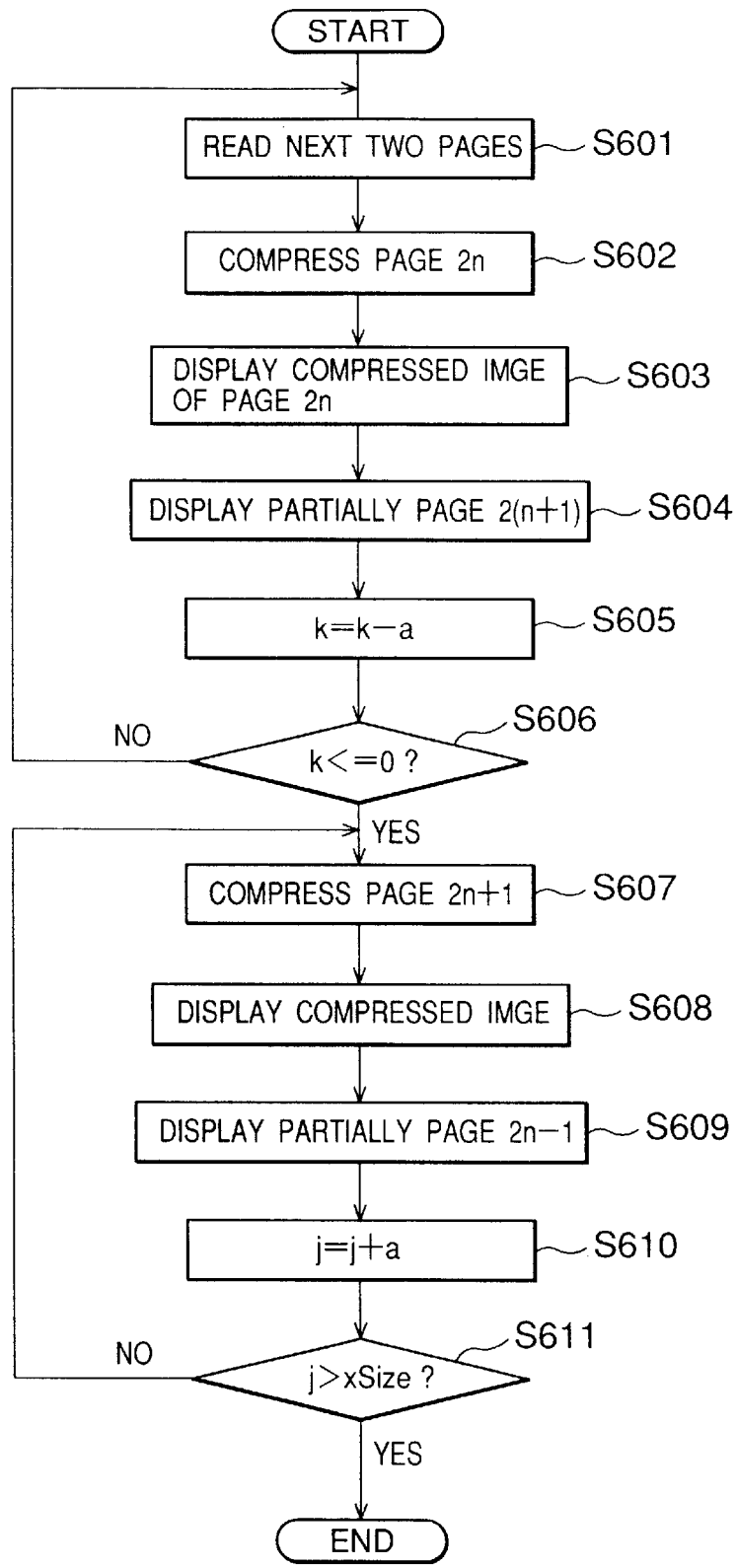
FIG. 6 is a flow chart showing a page turning sequence.

Referring to FIG. 6, a step S601 reads the data of icon images of two pages (2n+1 and 2(n+1)), succeeding to the two pages (2n−1 and 2n) currently displayed in the area 401 in FIG. 4. A step S602 compresses the icon image of page 2n. The icon image is assumed to have a size of xSize and ySize respectively in the horizontal and vertical directions. The icon image of page 2n is laterally compressed to obtain a compressed icon image of ySize in the vertical direction and k (k=xSize−a, wherein a is an integer smaller than xSize) in the horizontal direction A step S603 displays the compressed icon image of page 2n, prepared in the step S602, as shown in FIG. 7, in a rectangular area defined by coordinates (x+xSize, y), (x+xSize+k, y), (x+xSize, y+ySize) and (x+xSize+k, y+ySize) within the book-shaped icon 401 in FIG. 4.

A step S604 displays a part of the icon image of page 2(n+1). Within the icon image of page 2(n+1), an area defined by coordinates (k, 0), (xSize, 0), (0, ySize) and (xSize, ySize) is displayed, as shown in FIG. 7, into a rectangular area defined by coordinates (x+xSize+k, y), (x+2*xSize, y), (x+xSize+k, y+ySize) and (x+2*xSize, y+ySize) in the book-shaped icon area 401 in FIG. 4.

Then a step S605 substitutes (k−a) in k, and, if a step S606 identifies that k is larger than 0, there are repeated the steps S601 to S606. If the step S606 identifies that k does not exceed 0, the sequence proceeds to a step S607.

The step S607 compresses the icon image of page 2n+1, which appears as the other side of page 2n when it is hidden. The icon image of page 2n+1 is laterally compressed to obtain a compressed icon image of ySize in the vertical direction and j(j=a) in the horizontal direction. A step S608 displays, as shown in FIG. 8, the compressed icon image of page 2n+1, prepared in the step S607, in a rectangular area defined by coordinates (x+xSize−j, y), (x+xSize, y), (x+xSize−j, y+ySize) and (x+xSize, y+ySize) in the book-shaped icon 401 in FIG. 4. Then a step S609 displays a part of the icon image of page 2n−1. Within the icon image page 2n−1, an area defined by coordinates (0, 0), (xSize−j, 0), (0, ySize) and (xSize−j, ySize) is displayed, as shown in FIG. 8, into a rectangular area defined by coordinates (x, y), (x+xSize−j, y), (x, y+ySize) and (x+xSize y+ySize) in the book-shaped icon 401 in FIG. 4.

Then a step S610 substitutes j+a in j, and if a step S611 identifies that j does not exceed xSize, there are repeated the steps S607 to S611. If the step S611 identifies that j exceeds xSize, the page turning process is terminated. Also the left page turning process in the step S308 can be achieved by inverting the above-explained process in the horizontal direction.

In the following there will be explained, with reference to a flow chart in FIG. 9, a page turning method following the mouse movement.

FIGS. 10, 11, 12, 13, 16 and 17 are magnified views of the book-shaped icon shown in FIG. 4.

Figure 10:
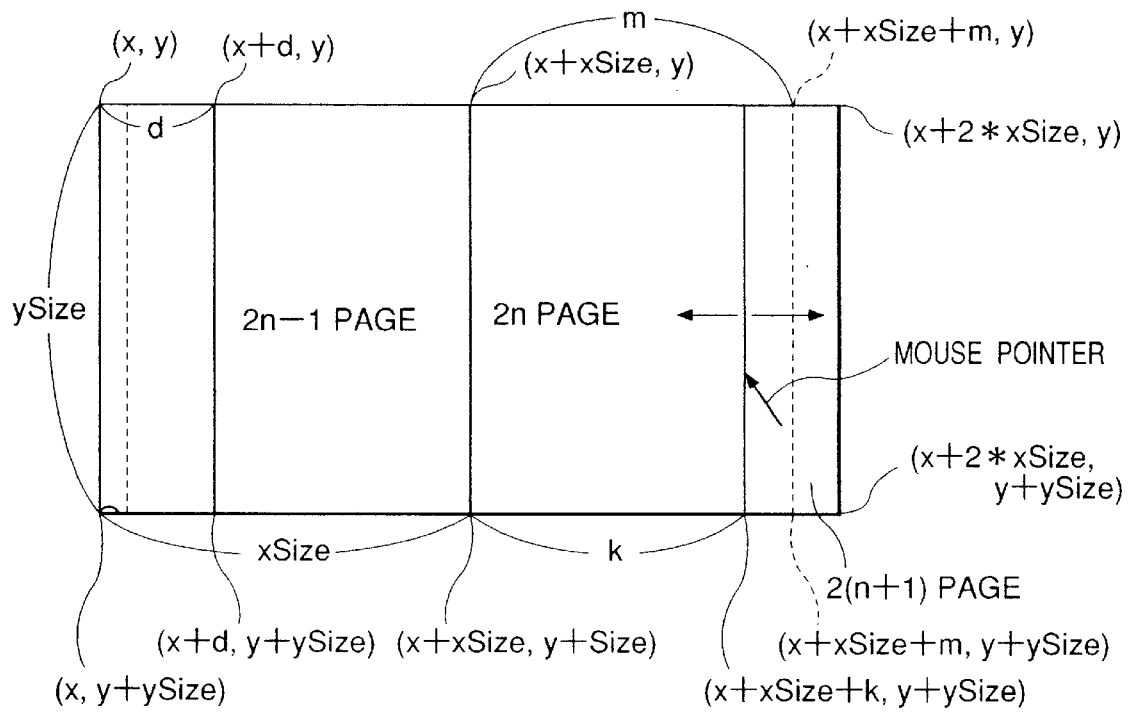
FIGS. 10 to 13 are magnified views of a book-shaped icon.
Figure 11:
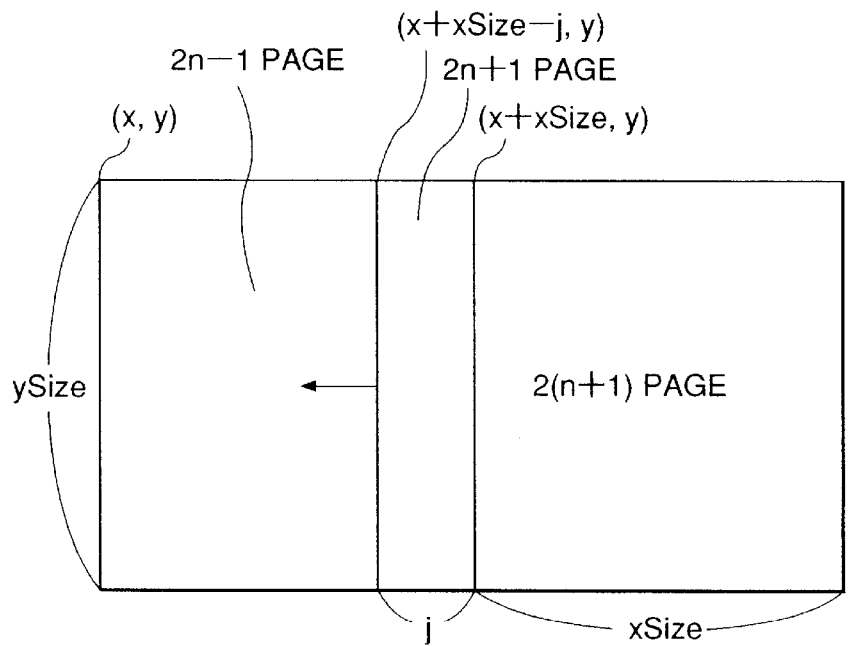

In case the mouse is clocked in the book-shaped icon in the browsing image shown in FIG. 4, a mouse button down interruption is generated in a step S101. Then a step S102 judges whether the button-down coordinate of the pointer of the mouse, at the time of interruption, is either in the left page icon area 401a or in the right page icon area 401b. If the point coordinate is in the left page icon area 401a, a step S103 executes a page turning start process of the left page icon area 401a. This process is to display, in the left-side page shown in FIG. 10, a compressed image to a position where the mouse button-down interruption is designated. It is assumed that, in FIG. 10, pages 2n−1 and 2n are respectively displayed in the left and right page icon areas. The button-down coordinate of the mouse pointer in the left page icon area in FIG. 10 is assumed to be (X0, Y0).

Figure 14:
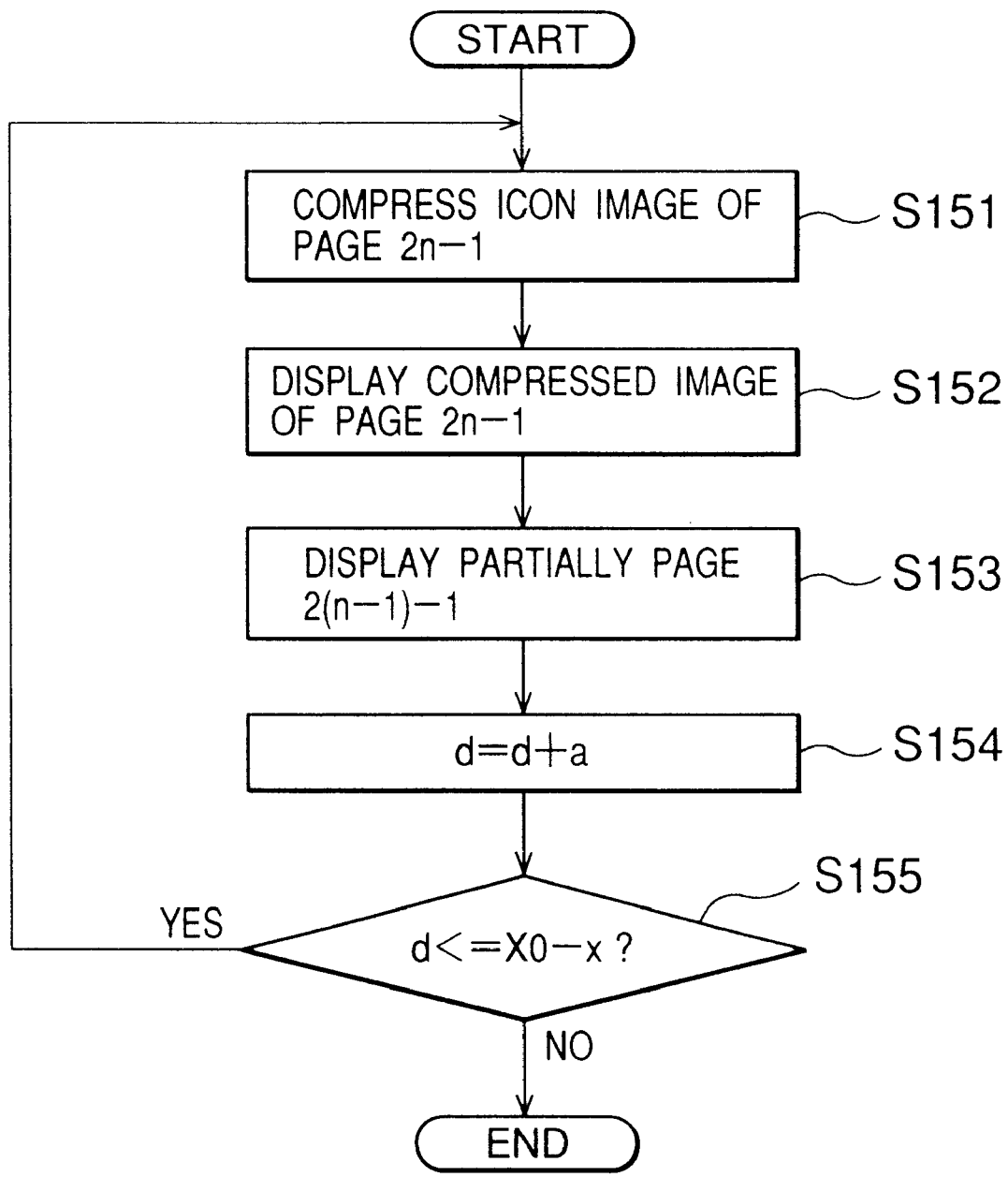
FIGS. 14 and 15 are flow charts showing a page turning start sequence.

FIG. 14 is a flow chart showing the page turning start process in the step S103.

A step S151 compresses the icon image of page 2n−1. The icon image of a size of xSize in the horizontal direction and ySize in the vertical direction is compressed in the lateral direction to obtain a compressed icon image of a size of ySize in the vertical direction and xSize−d (d having an initial value a; a being an integer smaller than xSize) in the horizontal direction A step S152 displays the compressed icon image of page 2n−1, prepared in the step S151, in a rectangular area in the left page icon area, defined by coordinates (x+d, y), (x+xSize, y), (x+d, y+ySize) and (x+xSize, y+ySize) as shown in FIG. 10. The foregoing steps S151 and S152 provide the display of the image of page 2n−1, compressed horizontally by d. Also a step S153 displays a part of the icon image of page 2(n−1)−1. More specifically, a part of the icon image of page 2(n−1)−1, in an area defined by coordinates (0, 0), (d, 0), (0, ySize) and (d, ySize) is displayed in a rectangular area in the book-shaped icon area, defined by coordinates (x, y), (x+d, y)(x, y+ySize) and (x+d, y+ySize) as shown in FIG. 10.

Then a step S154 substitutes d+a in d, and, if a step S155 identifies that d does not exceed X0−x, the steps S151 to S155 are repeated. On the other hand, if the step S155 identifies that d exceeds X0−x, the process is terminated The above-explained process effects the left page turning start process in the step S103.

If the step S102 identifies that the pointer coordinate at the generation of interruption by the mouse button-down is in the right page icon area 401b, a step S104 executes a page turning start process of the right page icon area 401b. It is assumed that a coordinate (X10, Y10) indicates the pointer coordinate of the mouse, at the button-down operation, in the right page icon area shown in FIG. 12.

Figure 12:
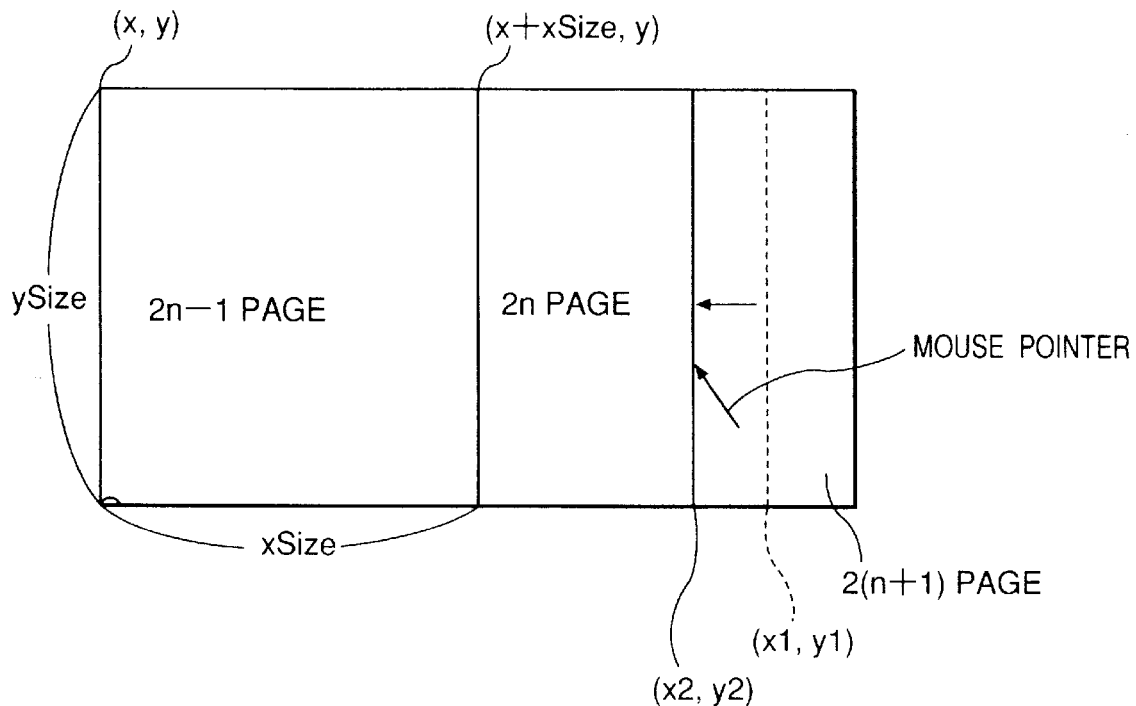
Figure 13:
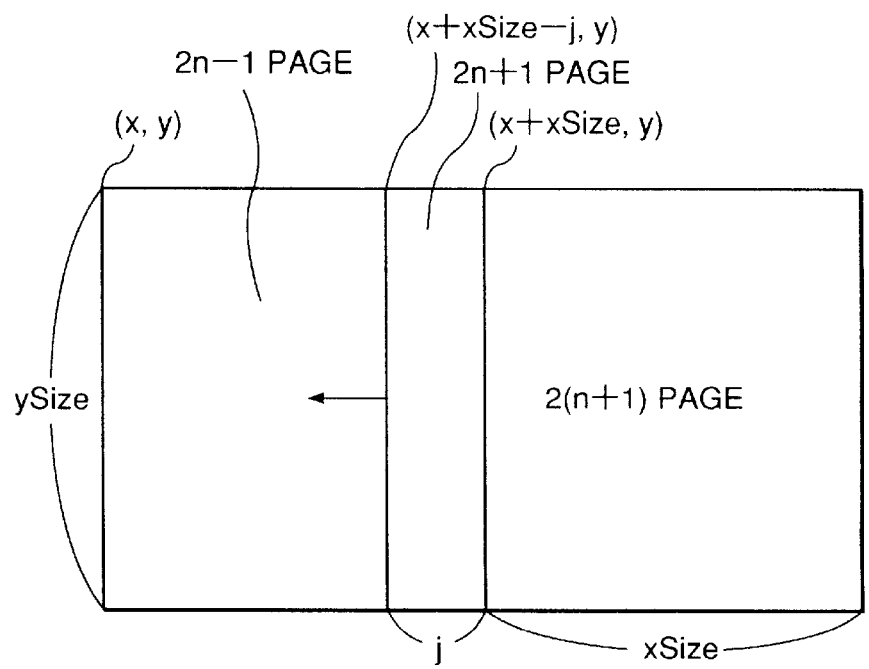
Figure 15:
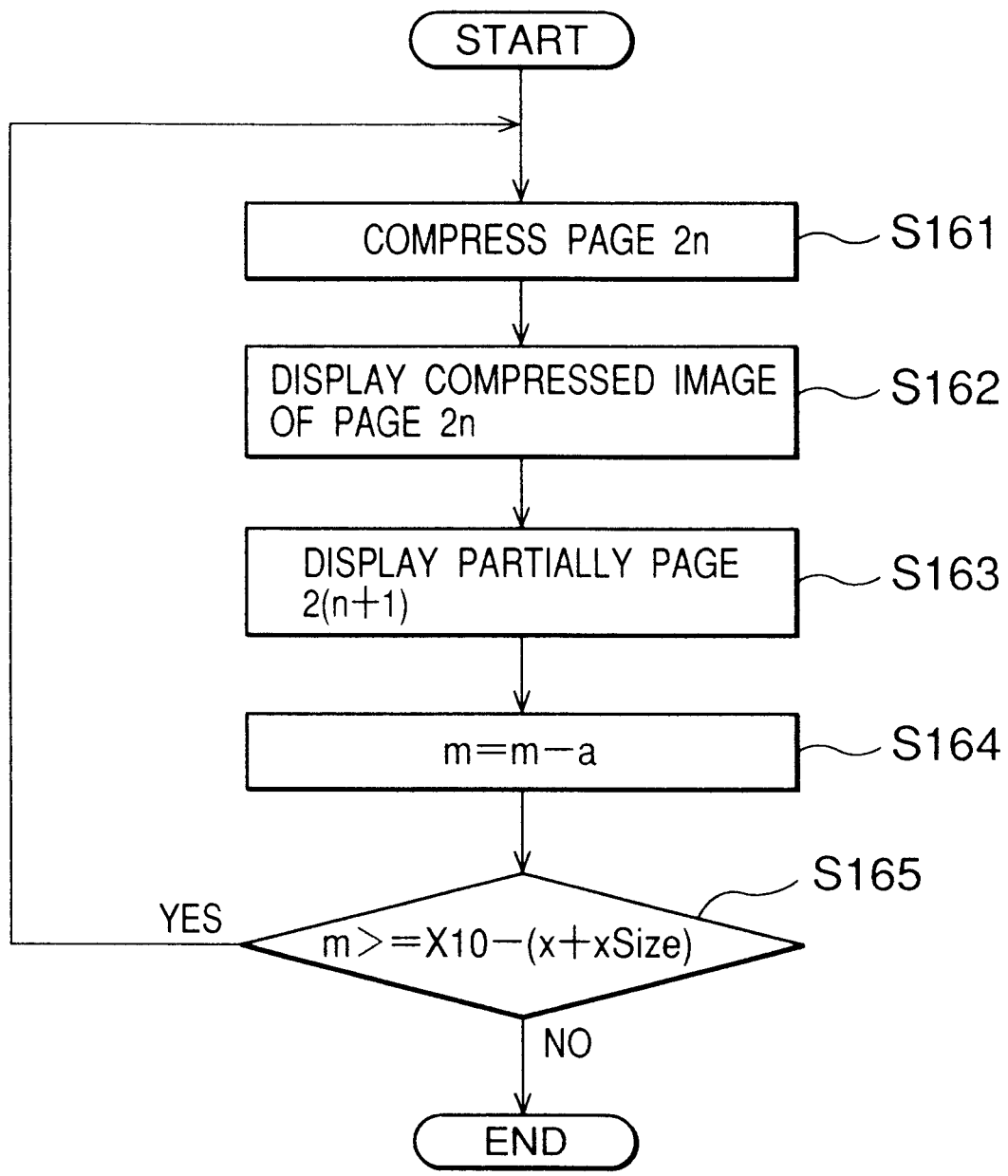

FIG. 15 is a flow chart showing the page turning start process in the step S104. A step S161 compresses the icon image of page 2n. The icon image of a size of xSize in the horizontal direction and ySize in the vertical direction is compressed in the lateral direction to obtain a compressed icon image of a size of ySize in the vertical direction and m (m having an initial value xSize) in the horizontal direction A step S162 displays the compressed icon image of page 2n, prepared in the step S161, in a rectangular area in the right page icon area, defined by coordinates (x+xSize, y), (x+xSize+m, y), (x+xSize, y+ySize) and (x2, y2)=(x+xSize+m, y+ySize) as shown in FIG. 12. The foregoing steps S161 and S162 provide the display of the image of page 2n, compressed horizontally. Also a step S163 displays a part of the icon image of page 2(n+1). More specifically, a part of the icon image of page 2(n+1), in an area defined by coordinates (m, 0), (xSize, 0), (m, ySize) and (xSize, ySize) is displayed in a rectangular area in the book-shaped icon area, defined by coordinates (x+xSize+m, y), (x+2*xSize, y), (x+xSize+m, y+ySize) and (x+2*xSize, y+ySize) as shown in FIG. 10. Then a step S164 substitutes m−a in m, and, if a step S165 identifies that m is at least equal to X10−(x+xSize), the steps S161 to S165 are repeated. On the other hand, if the step S165 identifies that m is less than X10−(x+xSize), the process is terminated. In this manner there is executed the right page turning start process in the step S104.

In the following there will be explained a process, after generation of interruption by the button-down operation of the mouse, that the user moves the mouse pointer as if to turn a page by holding an end of the page of the book, whereupon the page follows the movement of the mouse pointer.

When a step S105 accepts an interruption by a mouse movement, the sequence proceeds to a step S106, and, if the pointer coordinate of the immediately preceding interruption by a mouse movement or mouse button-down operation and that of the currently accepted interruption by the mouse movement are not in a same area (right page icon area or left page icon area), the sequence proceeds to a step S110. In the following there will be explained a case in which the mouse pointer moves from the left page icon area to the right page icon area.

Figure 16:
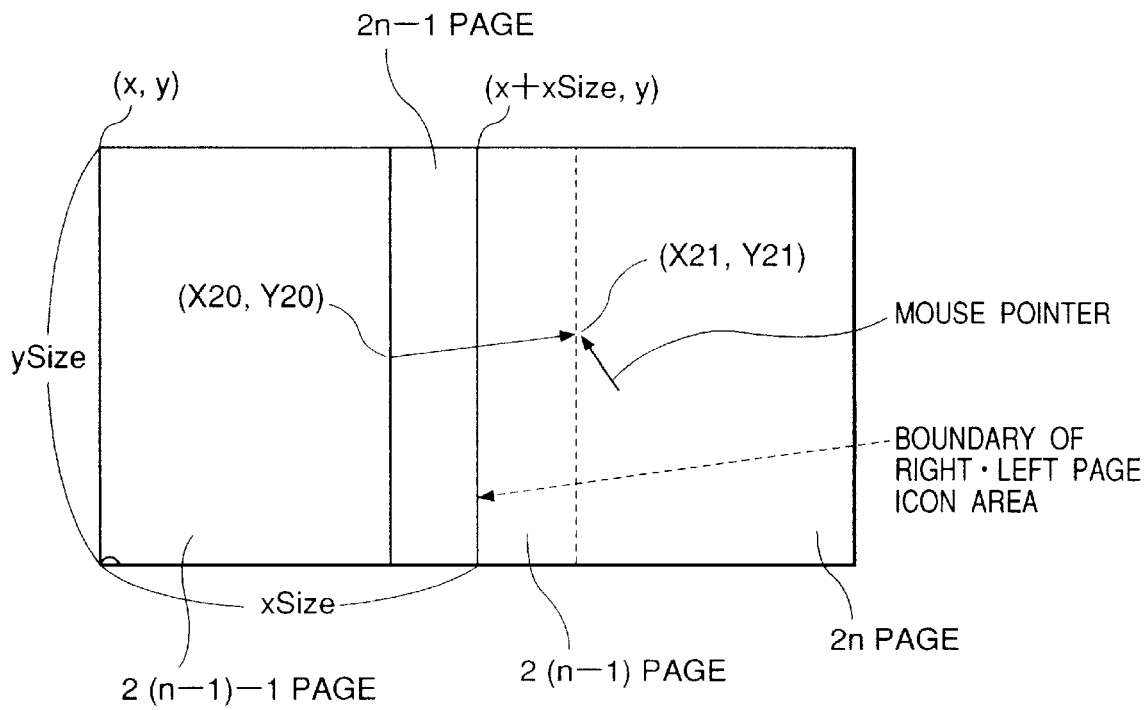
FIGS. 16 and 17 are magnified views of a book-shaped icon.

In FIG. 16, (X20, Y20) indicates the pointer coordinate of an interruption by the last mouse movement in the left page icon area, while (X21, Y21) indicates the pointer coordinate of an interruption by the first mouse movement in the right page icon area. A step S110 executes a page turning process from a page turning state when the pointer is at the coordinate (X20, Y20) to the boundary between the right and left page icon areas. More specifically, this step erases the image displayed on page 2n−1.

Then a step S111 executes a page turning process from the boundary between the right and left page icon areas to a page turning state when the pointer is at the coordinate (X21, Y21). Thereafter the sequence proceeds to the step S105.

If an interruption by a mouse button-up operation is generated in a step S112, the sequence proceeds to a step S113. If a step S106 identifies that the pointer coordinate in an immediately preceding interruption by the mouse movement or mouse button-down operation and that of the currently accepted interruption by the mouse movement are in a same area (right or left page icon area), the sequence proceeds to a step S107. The step S107 discriminates whether the pointer coordinate at the interruption by the mouse movement is in the left page icon area or in the right page icon area, and, if it is in the left page icon area, the sequence proceeds to a step S108 to execute the following process.

FIG. 14 is a flow chart showing a page turning start process in the step S108.

A step S151 compresses the icon image of page 2n−1. The icon image of a size of xSize in the horizontal direction and ySize in the vertical direction is compressed in the lateral direction to obtain a compressed icon image of a size of ySize in the vertical direction and xSize−d (d having an initial value a; a being an integer smaller than xSize) in the horizontal direction. A step S152 displays the compressed icon image of page 2n−1, prepared in the step S151, in a rectangular area in the left page icon area, defined by coordinates (x+d, y), (x+xSize, y), (x+d, y+ySize) and (x+xSize, y+ySize) as shown in FIG. 10. The foregoing steps S151 and S152 provide the display of the image of page 2n−1, compressed horizontally by d.

A step S153 displays a part of the icon image of page 2(n−1)−1. More specifically, a part of the icon image of page 2(n−1)−1, in an area defined by coordinates (0, 0), (d, 0), (0, ySize) and (d, ySize) is displayed in a rectangular area in the book-shaped icon area, defined by coordinates (x, y), (x+d, y), (x, y+ySize) and (x+d, y+ySize) as shown in FIG. 10.

Then a step S154 substitutes d+a in d, and, if a step S155 identifies that d does not exceed X0−x, the steps S151 to S155 are repeated. On the other hand, if the step S155 identifies that d exceeds X0−x, the process is terminated. In this manner there is achieved the page turning start process of the step S108.

In case the step S107 identifies that the pointer at the mouse movement is in the right page icon area, the sequence proceeds to a step S109 to execute the following process. FIG. 15 is a flow chart showing the page turning start process of the step S109.

A step S161 compresses the icon image of page 2n. The icon image of a size of xSize in the horizontal direction and ySize in the vertical direction is compressed in the lateral direction to obtain a compressed icon image of a size of ySize in the vertical direction and m (m having an initial value xSize) in the horizontal direction. A step S162 displays the compressed icon image of page 2n, prepared in the step S161, in a rectangular area in the right page icon area, defined by coordinates (x+xSize, y), (x+xSize+m, y), (x+xSize, y+ySize) and (x2, y2)=(x+xSize+m, y+ySize) as shown in FIG. 12. The foregoing steps S161 and S162 provide the display of the image of page 2n, compressed horizontally. Also a step S163 displays a part of the icon image of page 2(n+1). More specifically, a part of the icon image of page 2(n+1), in an area defined by coordinates (m, 0), (xSize, 0), (m, ySize) and (xSize, ySize) is displayed in a rectangular area in the book-shaped icon area, defined by coordinates (x+xSize+m, y), (x+2*xSize, y), (x+xSize+m, y+ySize) and (x+2*xSize, y+ySize), as shown in FIG. 10.

Then a step S164 substitutes m−a in m, and, if a step S165 identifies that m is at least equal to X10(x+xSize), the steps S161 to S165 are repeated. On the other hand, if the step S165 identifies that m is less than X10−(x+xSize), the process is terminated. In this manner there is executed the page turning start process in the step S109.

Figure 9:
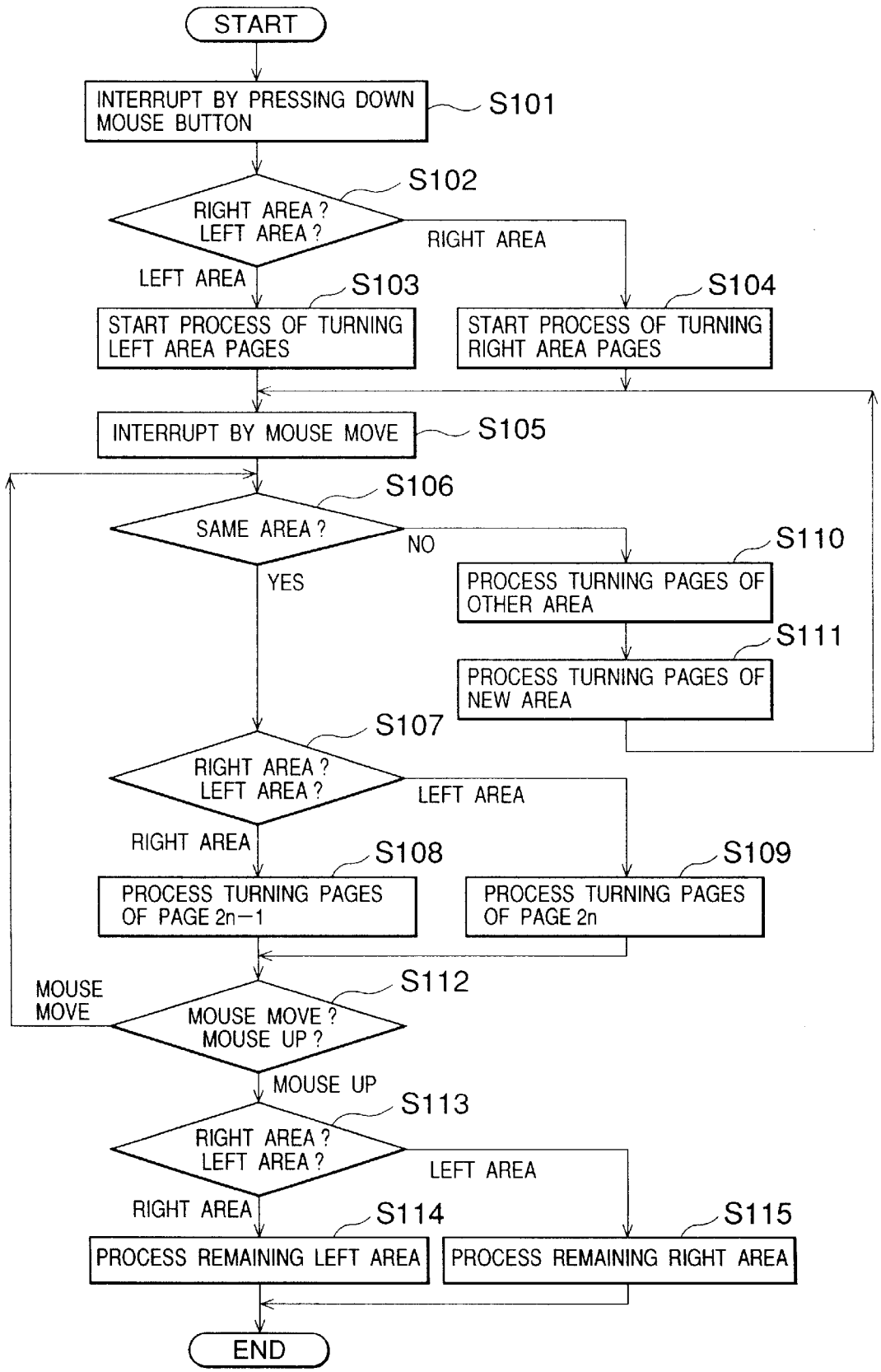
FIG. 9 is a flow chart showing a page turning sequence, employing mouse operation.

Then a step S112 discriminates whether the next mouse interruption is caused by a mouse movement or a mouse button-up operation, and the sequence respective proceeds to a step S106 or S113, as shown in FIG. 9. The step S113 discriminates whether the pointer coordinate at the interruption by the mouse movement is in the right page icon area or in the left page icon area, and, if it is in the left page icon area, the sequence proceeds to a step S115.

Figure 17:
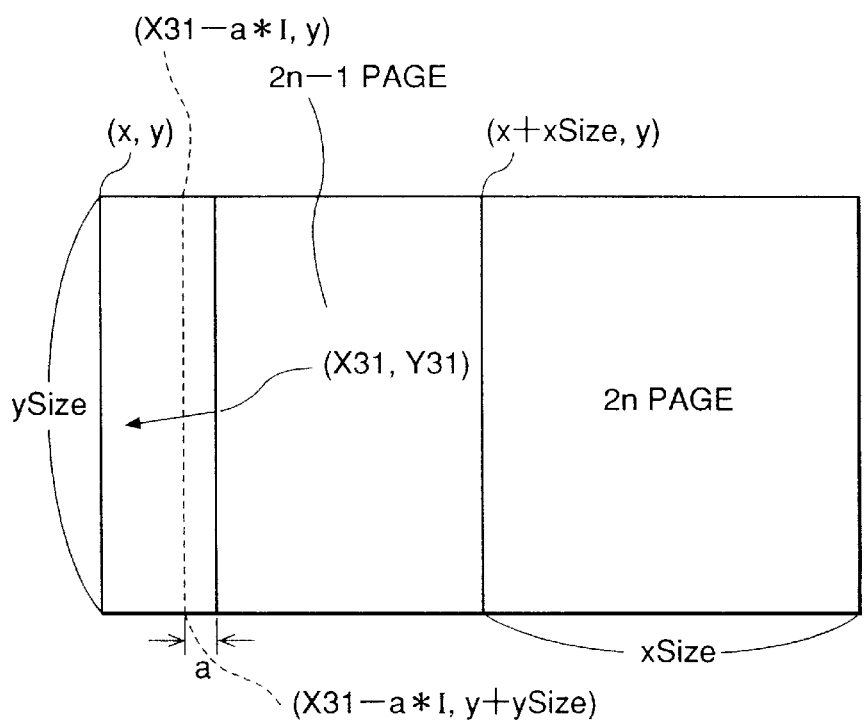
Figure 18:
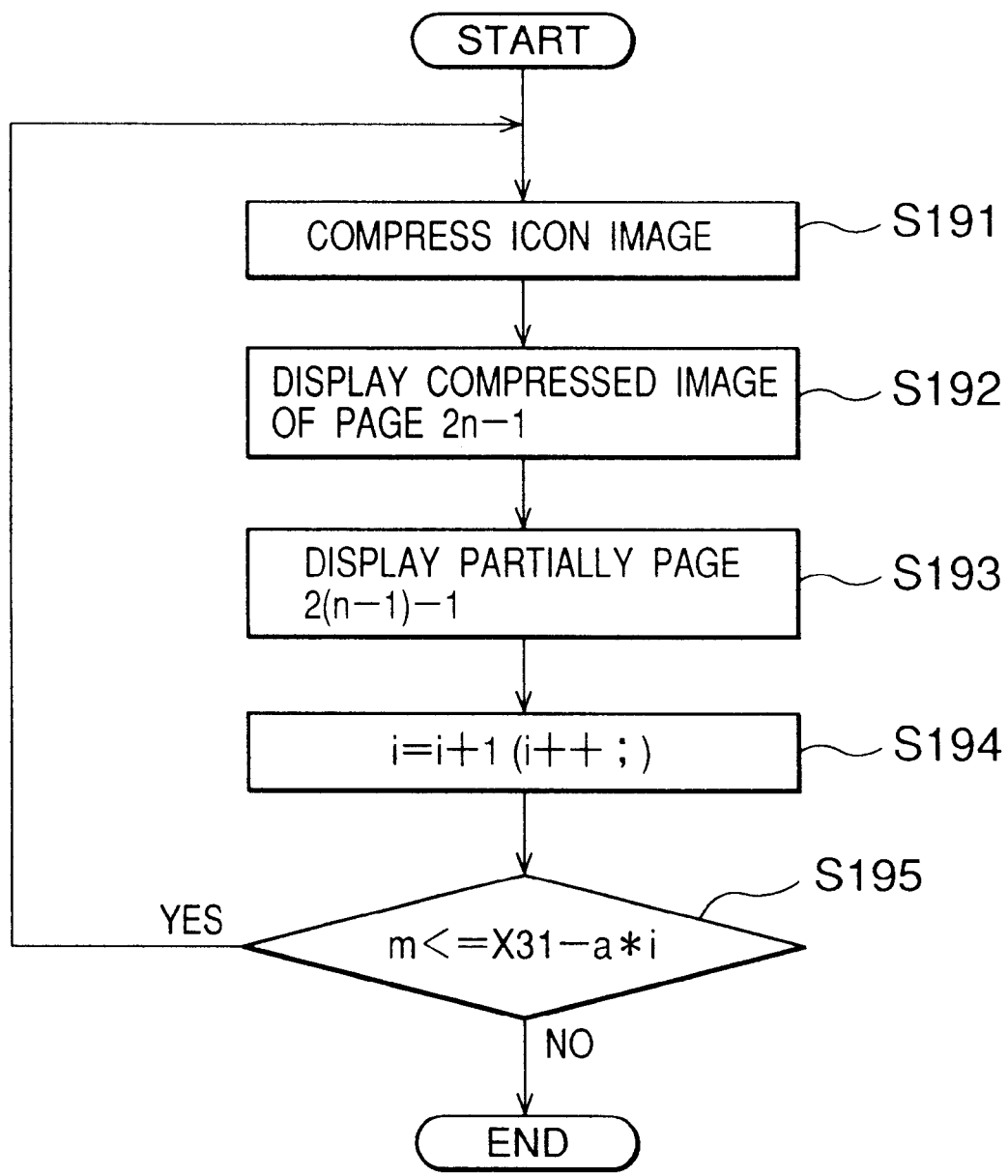
FIG. 18 is a flow chart showing a post-process of page turning.

FIG. 17 shows a state when the pointer coordinate at the mouse button-up operation is at (X31, Y31), and FIG. 18 is a flow chart showing a post process for a page turning.

A step S191 compresses the icon image of page 2n−1, having a size of ySize in the vertical direction and xSize in the horizontal direction, into an image size of ySize in the vertical direction and X31−a*i (i being an integer with an initial value 1) in the horizontal direction. A step S192 displays the icon image of page 2n−1 in a rectangular area defined by coordinates (X31−a*i, y), (x+xSize, y), (X31−a*i, y+ySize) and (x+xSize, y+ySize). Then a step S193 displays a page of the image of page 2(n−1)−1. More specifically a part of the icon image of page 2(n−1)−1, in an area defined by coordinates (0, 0), (X31−a*i, 0), (0, ySize) and (X31−a*i−x, ySize) is displayed in a rectangular area in the book-shaped icon area, defined by coordinates (x, y), (X31−a*i, y), (x, y+ySize) and (X31−a*i, y+ySize) as shown in FIG. 17. A step S194 substitutes i+1 in the integer i (having initial value 1), as represented by [i+1;] in the C-language, and, if a step S195 identifies that X31−a*i is at least equal to x, the sequence proceeds to a step S191. If not, the sequence is terminated.

This flow chart shows the process of the step S115. If the step S113 identifies that the pointer coordinate is in the left page icon area, the sequence proceeds to a step S114 to execute a page turning post process in a similar manner.

In this manner there can be achieved the page turning process, following the movement of the mouse pointer.

Figure 19:
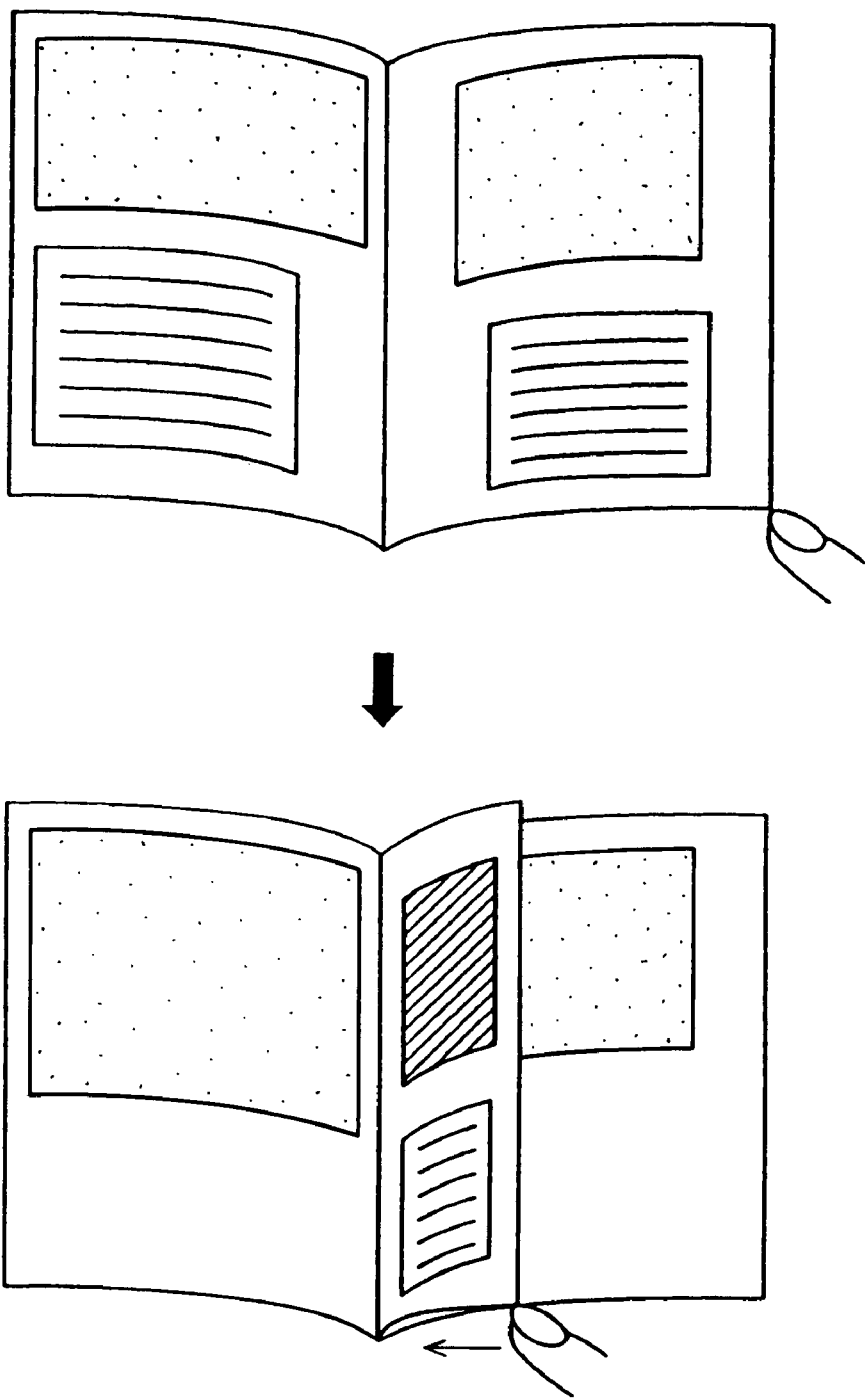
FIG. 19 is a flow chart showing a page turning sequence following a finger operation.

In the foregoing first embodiment, the processes are executed by the mouse, but a touch panel or a remote mouse is also applicable. More specifically, as shown in FIG. 19, an operation of touching the touch panel with a finger, an operation of moving the finger and an operation of lifting the finger from the touch panel respectively correspond to the button-down operation of the mouse, mouse dragging and mouse button-up operation. It is therefore easily possible to refer to 2 to 4 pages of icon images, by causing the page to follow the mouse or finger movement.

As explained in the foregoing, the first embodiment can improve the reviewability of the information by the use of the book-shaped icon and the page display image frame.

It also eliminates the inefficient operation of referring to the next page, as conventionally adopted in the editor of the word processor, and enables easy reference to the information by a simple operation seemingly similar to the page turning of a book, so that it is easily usable by the user who is not skilled in handling the office automation equipment.

It further allows to refer to the content of plural pages, by causing the page to follow the movement of the mouse pointer in the book-shaped icon.

Furthermore, switching of the right-side page and the left-side page can be easily achieved by merely clicking the right or left page icon area. Furthermore, the ability of observing all the data, not available for example in the information search in the multimedia, can be recovered by the use of the book-shaped icon, and the user is rendered possible to browse the information easily.

(b) Second embodiment:

In the following there will be explained a second embodiment of the present invention, with reference to the attached drawings.

Figure 20:
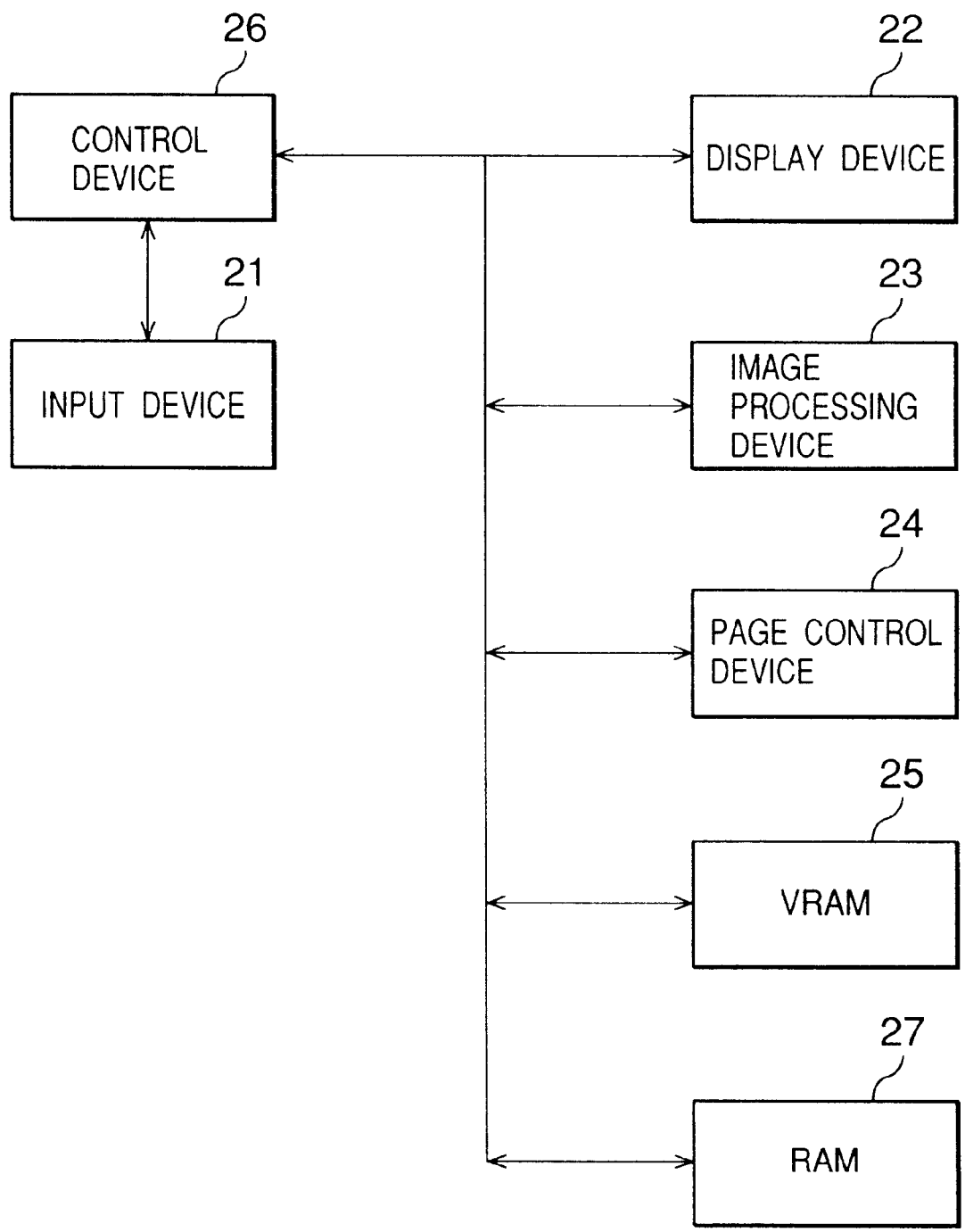
FIG. 20 is a schematic block diagram of an information processing apparatus constituting a second embodiment of the present invention.

FIG. 20 is a schematic block diagram of an information processing apparatus constituting a second embodiment of the present invention, wherein provided are an input device 21 such as a mouse or a keyboard for entering the instructions from the user; a display device 22 for displaying desired image data; an image processing device 23 for effecting predetermined image processing such as lateral page compression or expansion; a page control device 24 for correlating a predetermined tag with a page corresponding thereto; a video RAM (VRAM) 25 having addresses corresponding, in one-to-one correspondence, to the display image frame of the display device 22; a RAM 27 for storing the image data and the tag image of each page; and a control device 26 connected to the foregoing components, for controlling the same.

Figure 22:
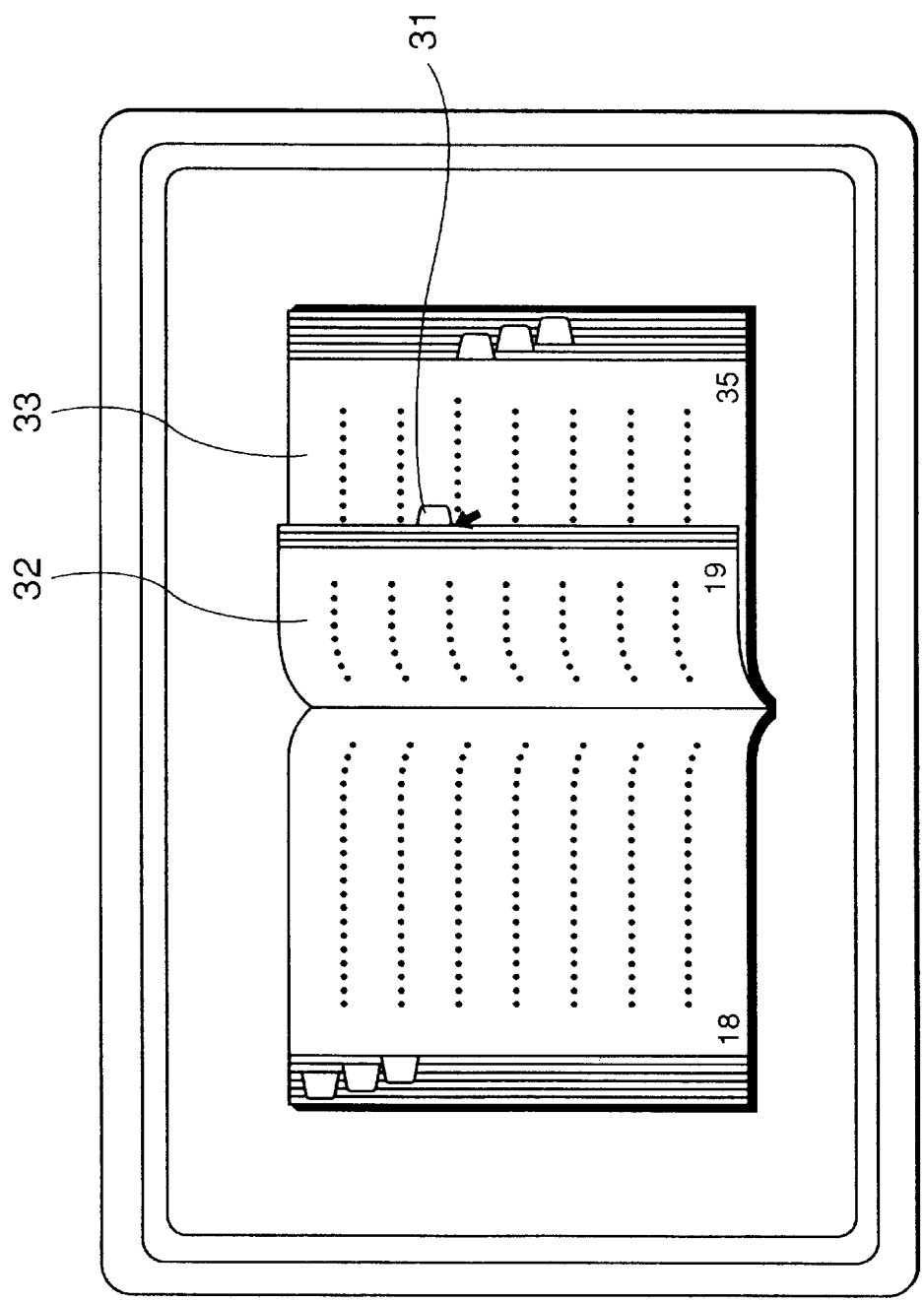
FIG. 22 is a view showing an example of display in case of page turning by the page turning method of the second embodiment.

In the information processing apparatus of the above-explained configuration, by gripping a tag 31 with the mouse and moving the mouse pointer to the center of the image frame as shown in FIG. 22, a page 32 is laterally compressed and a next page 33 appears partially. When the mouse pointer is moved to the left beyond the center of the image frame, the rear face of the tagged page appears in a laterally compressed state, from the center of the image frame to the position of the mouse pointer. When the gripping by the mouse is released, the compressed rear face page is now displayed with the normal width. In this manner the tagged page is completely turned over from the right to the left, and the page switching is completed.

In the following there will be explained, as an example, an operation of turning a right-hand side page.

In the above-explained information processing apparatus, when the tag gripping with the mouse is entered from the input device 21 to the control device 26, it informs the page control device 24 of the tag selection. In response, the page control device 24 informs the control device 26 of a page corresponding to the above-mentioned tag. Then, when the mouse movement in the gripped state is entered from the input device 21 to the control device 26, the image data of the currently displayed page are read from the VRAM 25 and are transmitted to the image processing device 23. At the same time, data indicating the width of the mouse movement are transmitted to the image processing device 23, which compresses the image data based on the above-mentioned width data to obtain compressed image data. Then the control device 26 rewrites the content of the VRAM 25, based on the compressed image data prepared by the image processing device 23, and, in a marginal area formed by the page compression, partially releases the information of a page underlying the currently turned page. As the mouse pointer is moved further, and, when it is identified from the coordinate of the pointer that it has moved from the right-side page to the left-side page beyond the boundary therebetween to reveal the rear face page of the turned page, the control device 26 recognizes the rear face page of the tagged and currently turned page, from the information of the page control device 24, and transmits the page information stored in advance in the RAM 27 to the image processing device 23 to obtain compressed image data therefrom Then the control device 26 writes the compressed image data in the VRAM 25 and causes the display device 22 to display the content thereof.

Subsequently, when the end of gripping of the mouse is entered from the input device 21 to the control device 26, the image data of the page under compressed display at this point and the partially displayed page are replaced by the uncompressed image data of the former page, and such uncompressed image data are written in the VRAM 25 and displayed on the display device 22.

Figure 21:
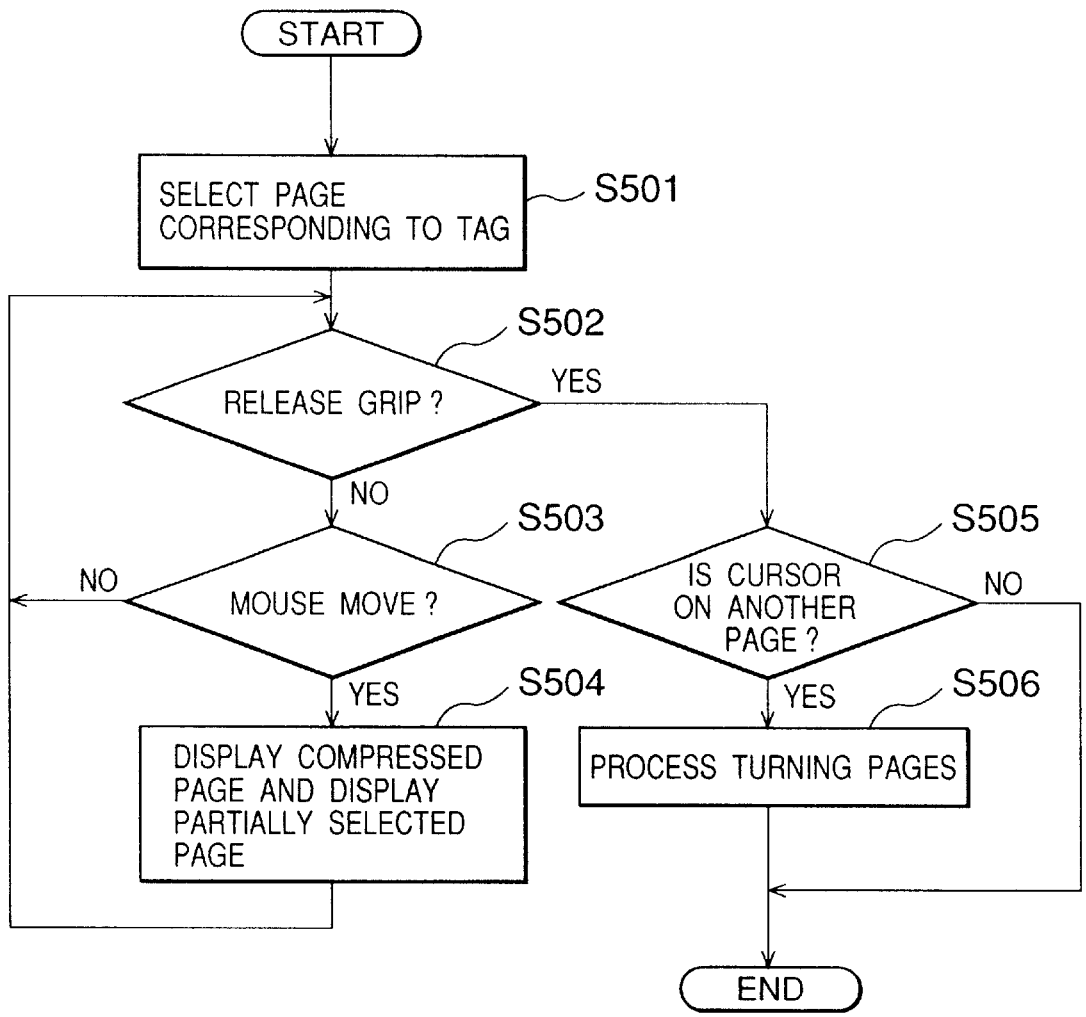
FIG. 21 is a flow chart showing a page turning sequence in the above-mentioned information processing apparatus.

FIG. 21 is a flow chart showing the page turning process of the above-explained information processing apparatus.

At first a step S501 grips the tag with the mouse and selects a page corresponding to the tag. Then a step S502 discriminates whether the gripping is released, and, if not, a step S503 discriminates whether the mouse has been moved. If not, the sequence returns to the step S502, but, if moved, a step S504 effects compressed display of the page according to the mouse movement and partial display of a selected page, and then the sequence returns to the step S502. On the other hand, if the step S502 identifies that the gripping of the mouse has been released, there is discriminated whether the mouse pointer is present on the other page, and, if not, the original display state is restored and the sequence is terminated, but, if present, the page switching by page turning is executed and the process is terminated.

For facilitating the page selection, the tags are preferably arranged in a predetermined order. More specifically, the page selection can be facilitated by arranging the tags in the descending or ascending order of page numbers.

Figure 24:
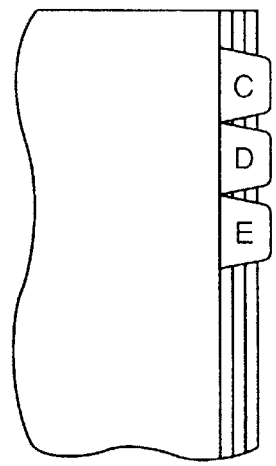
FIG. 24 is a magnified view of the display of tags after tag deletion.
Figure 25:
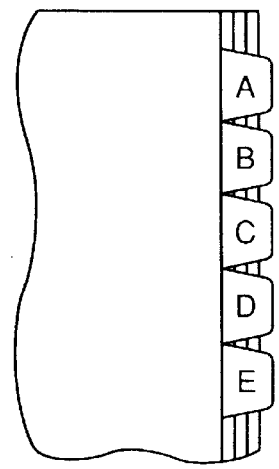
FIG. 25 is a magnified view of the display of tags after tag insertion.

(c) Third embodiment:

In the following there will be explained a third embodiment of the present invention, with reference to FIGS. 23 to 25.

Figure 23:
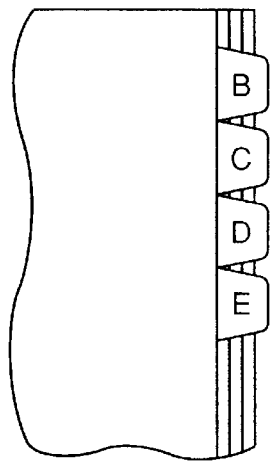
FIG. 23 is a magnified view of the display of tags.

FIG. 23 is a magnified view of display of tags arranged in the order of pages. In a tag portion of the book there are attached tags B, C, D and E, and a page correlated with the tag B is presently opened. In this case the input device 1 is given a deletion command, and, when the user selects the deletion command by designating the tag B, it is deleted as shown in FIG. 24, so that a page correlated with the tag C can be positioned at the top.

Also in case it is desired to place a page correlated with the tag A in front of the page of the tag B which is presently at the top, the input device 1 is given an insertion command, and, when the user selects the insertion command by designating a position above the tag B, the tag A can be inserted by displacing other tags B, C, D and E without disturbing the order thereof.

In this manner the tags are not only attached in advance to pages adequate as partitions of the book, but also can be arbitrarily inserted or deleted, so that the page selection can be made more conveniently.

In case of inserting or deleting a tag to or from the tags arranged in a predetermined order, automatic upward or downward displacement of the display positions of the other tags allows to maintain the desired order of tags and to avoid wasting of the tag display area.

As explained in the foregoing, the second and third embodiments allow to easily turn plural pages, and, by the ability to insert or delete the tags, to immediately designate and open the page desired by the user. Also the adjustment of the gap of display of the tags allows to maintain the desired order of tags and to avoid waste in the tag display area.

The present invention is applicable not only to a system composed of plural equipment but also to an apparatus consisting of a single equipment. It is naturally applicable also to a case where the present invention is realized by the supply of a program to a system or an apparatus In such case a memory medium, storing a program embodying the present invention, constitutes the present invention. By reading the program from such memory medium into the system or the apparatus, the system or the apparatus functions according to such program.

What is claimed is:

1. An information processing apparatus comprising:
    tag memory means for storing plural tags correlated with specified pages in an image in the form of a book in a display image frame;
    display means for displaying, on said display image frame, said image in the form of a book in an open state with said plural tags stored in said tag memory means;
    tag designation means for designating a tag among the plural tags in said tag memory means;
    page turning means for turning at least one page on said display means by moving said designated tag:
    judgment means for judging whether said designated tag reaches a central position of the book or not in the course of turning plural pages by said page turning means; and
    control means for displaying the image of an obverse page on the at least one page turned by said turning means in case said designated tag does not reach the central position of the book, and displaying the image of a reverse face page on the at least one page turned by said page turning means in case the designated tag reaches the central position of the book.

2. An information processing apparatus according to claim 1, wherein a tag display area is provided at an end portion of the image of the book displayed in said display image frame.

3. An information processing apparatus according to claim 1, wherein said tag designation means is composed of a mouse.

4. An information processing apparatus according to claim 1, wherein said tag designation means is composed of a mouse, and a tag display area is provided at an end portion of the image of the book displayed in said display image frame, and a specified tag displayed in said tag display area is designated by said mouse.

5. An information processing apparatus according to claim 1, wherein the plural tags stored in said tag memory means are displayed, in the display image-frame, in a predetermined position at an end portion of the image of said book, based on the order of pages to which said tags are attached.

6. An information processing apparatus according to claim 1, further comprising tag insertion means for inserting a new tag into said tag memory means.

7. An information processing apparatus according to claim 1, further comprising tag deletion means for deleting a specified tag from said tag memory means.

8. An information processing apparatus according to claim 1, further comprising adjustment means for adjusting the gap of display of the tags, in such a manner that all the tags can be displayed in said display image frame.

9. An information processing apparatus according to claim 1, wherein said control means is adapted to display the image of said obverse page or the image of the reverse face page of said open page in compressed manner according to the position of the designated tag.

10. A page turning method for use in an information processing apparatus comprising steps of:
    storing plural tags correlated with specified pages in the form of a book in a display image frame;
    displaying, on said display image frame, said image in the form of a book in an open state with said plural tags stored in said tag storing step;
    designating a tag among said plural tags stored in said tag storing step;
    turning at least one page on said display image frame by moving the designated tag;
    judging whether said designated tag reaches a central position of the book or not in the course of turning said pages; and
    displaying the image of an obverse page on the at least one page turned by said page turning step in case said designated tag does not reach the central position of the book, and displaying the image of a reverse face page on the at least one page turned by said page turning step in case said designated tag reaches the central position of the book.

11. A page turning method for use in an information processing apparatus according to claim 10, further comprising a step of inserting a new tag into the tags displayed with a predetermined order in the display image frame.

12. A page turning method for use in an information processing apparatus according to claim 10, further comprising a step of deleting a specified tag from the tags displayed with a predetermined order in the display image frame.

13. A page turning method for use in an information processing apparatus according to claim 10, further comprising a step of adjusting the gaps of display of-the gaps in such a manner that all the tags can be displayed in said image display frame.

14. A page turning method for use in an information processing apparatus according to claim 10, wherein a tag display area is provided at an end portion of the image in the form of the book displayed in said display image frame.

15. A page turning method for use in an information processing method according to claim 10, wherein tag designating is performed by a mouse.

16. A page turning method for use in an information processing method according to claim 10, wherein said tag designation is performed by a mouse, and a tag display area is provided at an end portion of the image in the form of the book displayed in said display image frame, and a specified tag displayed in said tag display area is designated by said mouse.

17. A page turning method for use in an information processing apparatus according to claim 10, wherein the plural stored tags are displayed in the display image frame in a predetermined position at an end portion of the image in the form of said book, based on the order of pages to which said tags are attached.

18. A page turning method for use in an information processing apparatus according to claim 10, wherein said control is adapted to displaying the image of said open page or the image of the reverse face page of said open page in compressed manner according to the position of the designated tag.

19. An information processing apparatus comprising:
    display means for displaying an icon in the form of a book in an open state;

designation means for designating one of two open pages on said icon by a pointer;

page turning means for turning at least one page on said display means by moving said designated pointer;

judgment means for judging whether said pointer reaches a central position of the book or not in the course of turning plural pages by said page turning means; and control means for displaying the image of said designated page in case said pointer does not reach the central position of the book, and displaying the image of a reverse face page of said designated page in case the pointer reaches the central position of the book.

20. An information processing apparatus according to claim 19, wherein said control means is adapted to display the image of of said designated page or the image of the reverse face page of said designated page in compressed manner to the position of said pointer, and also to display the image of an underlying page.

21. An information processing apparatus according to claim 19; wherein said pointer is composed of a mouse.

22. An information processing apparatus according to claim 19; wherein said pointer is a finger.

23. An information processing apparatus according to claim 19, further comprising:

determination means for determining whether to return to the original display without page turning or to effect the page turning for displaying next two pages, based on whether said pointer reaches the predetermined position of the book.

24. An information processing apparatus according to claim 19, wherein said control means is adapted to display the image of said designated page or the image of the reverse face page of said designated page in compressed manner according to the position of said pointer.

25. An information processing apparatus according to claim 19, wherein said judgment means is adapted to judge whether said pointer reaches the center of the book or not.

26. An information processing apparatus comprising:

display means for displaying an icon in the form of a book in an open state;

designation means for designating one of two open pages on said icon by a pointer;

page turning means for turning at least one page on said display means by moving said designated pointer;

judgment means for judging whether said pointer reaches the other of the two open pages of the book or not; and control means for displaying the image of said designated page in compressed manner in case the pointer does not reach the other open page of the book, and displaying an image of the reverse face page of said designated page in compressed manner in case the pointer reaches the other open page of the book.

27. An information processing method comprising the steps of:

displaying an icon in the form of a book in an open state;

designating one of two open pages on said icon by a pointer;

turning at least one page by moving the designated pointer;

judging whether said pointer reaches a central position of the book or not in the course of said page turning step; and displaying the image of said designated page in case said pointer does not reach the central position of the book, and displaying the image of a reverse face page of said designated page in case the pointer reaches the central position of the book.

28. An information processing method according to claim 27, wherein said control step is adapted to display the image of of said designated page or the image of the reverse face page of said designated page in compressed manner according to the position of said pointer, and also to display the image of an underlying page.

29. An information processing method according to claim 27 wherein the designation by said pointer is executed by a mouse.

30. An information processing method according to claim 27, wherein the designation by said pointer is executed by a finger.

31. An information processing method according to claim 27, further comprising:

a determination step of determining whether to return to the original display without page turning or to effect the page turning for displaying next two pages, based on whether said pointer reaches the predetermined position of the book.

32. An information processing method according to claim 27, wherein said control step is adapted to display the image of said designated page or the image of the reverse face page of said designated page in compressed manner according to the position of said pointer.

33. An information processing method according to claim 27, wherein said judging step is adapted to judge whether said pointer reaches the center of the book or not.

34. An information processing method comprising the steps of:

displaying an icon in the form of a book in an open state;

designating one of two open pages on said icon by a pointer;

turning at least one page by moving the designated pointer;

judging whether said pointer reaches the other of the two open pages of the book or not in the course of said page turning step; and displaying the image of said designated page in compressed manner in case the said pointer does not reach the other open page of the book, and displaying an image of a reverse face page of the designated page in compressed manner in case the pointer reaches the other open page of the book.

35. A storage medium for storing computer readable program code in an information processing apparatus, comprising:

a first set of computer readable program instruction codes for storing plural tags correlated with specified pages in an image in the form of a book in a display image frame;

a second set of computer readable program instruction codes for displaying on the display image frame, the image in the form of a book in an open state with the plural stored tags;

a third set of computer readable program instruction codes for designating a tag among the plural stored tags;

a fourth set of computer readable program instruction codes for turning at least one page on the display image frame by moving the designated tag;

a fifth set of computer readable program instruction codes for controlling displaying of the image of an obverse page on the at least one page turned by said page turning in case said designated tag does not reach the central position of the book, and for displaying the image of a reverse face page on the at least one page turned by said page turning in case the designated tag reaches the central position of the book.

36. A storage medium for storing computer readable program code in an information processing apparatus, comprising:
- a first set of computer readable program instruction codes for displaying an icon in the form of a book in an open state;
- a second set of computer readable program instruction codes for designating one of two open pages on said icon by a pointer;
- a third set of computer readable program instruction codes for turning at least one page by moving the designated pointer;
- a fourth set of computer readable program codes for judging whether said pointer reaches a central position of the book or not in course of said page turning; and
- a fifth set of computer readable program codes for controlling display of the image of said designated page in case said pointer does not reach the central position of the book, and displaying the image of a reverse face page of said designated page in case the pointer reaches the central position of the book.

37. A storage medium for storing computer readable program instruction codes in an information processing apparatus, comprising:
- a first set of computer readable program instruction codes for displaying an icon in the form of a book in an open state;
- a second set of computer readable program instruction codes for designating one of two open pages on said icon by a pointer;
- a third set of computer readable program instruction codes for turning at least one page by moving the designated pointer;
- a fourth set of computer readable program codes for judging whether said pointer reaches the other of the two open pages of the book or not in course of said page turning; and
- a fifth set of computer readable program codes for controlling display of the image of said designated page in compressed manner in case the pointer does not reach the other open page of the book, and displaying an image of a reverse face page of said designated page in compressed manner in case the pointer reaches the other open page of the book.

* * * * *

UNITED STATES PATENT AND TRADEMARK OFFICE
CERTIFICATE OF CORRECTION

PATENT NO. : 5,900,876
DATED : May 4, 1999
INVENTOR(S) : TAKASHI YAGITA, ET AL.

It is certified that error appears in the above-identified patent and that said Letters Patent is hereby corrected as shown below:

COLUMN 1:

Line 61, "specified pages" should read --specified page--.

COLUMN 5:

Line 33, "clocked" should read --clicked--.
　　Line 51, "Astep" should read --A step--.

COLUMN 8:

Line 4, "X10(x+xSize)," should read --X10-(x+xSize),--.

COLUMN 12:

Line 36, "of-the" should read --of the--.

UNITED STATES PATENT AND TRADEMARK OFFICE
CERTIFICATE OF CORRECTION

PATENT NO. : 5,900,876
DATED : May 4, 1999
INVENTOR(S) : TAKASHI YAGITA, ET AL.

It is certified that error appears in the above-identified patent and that said Letters Patent is hereby corrected as shown below:

<u>COLUMN 14</u>:

Line 10, "27" should read --27,--.

Signed and Sealed this

Seventh Day of November, 2000

Attest:

Q. TODD DICKINSON

*Attesting Officer*     *Director of Patents and Trademarks*